US010885565B1

(12) United States Patent
Russell et al.

(10) Patent No.: US 10,885,565 B1
(45) Date of Patent: Jan. 5, 2021

(54) NETWORK-BASED DATA DISCOVERY AND CONSUMPTION COORDINATION SERVICE

(71) Applicant: Amazon Technologies, Inc., Reno, NV (US)

(72) Inventors: Barry Russell, Seattle, WA (US); Rahul Sharma Pathak, Seattle, WA (US); Aditya Krishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 474 days.

(21) Appl. No.: 14/311,173

(22) Filed: Jun. 20, 2014

(51) Int. Cl.
*G06Q 30/00* (2012.01)
*G06Q 30/06* (2012.01)

(52) U.S. Cl.
CPC .............................. *G06Q 30/0625* (2013.01)

(58) Field of Classification Search
CPC .................................................. G06Q 30/0625
USPC ...................................................... 705/26.62
See application file for complete search history.

(56) References Cited

U.S. PATENT DOCUMENTS

| | | | |
|---|---|---|---|
| 8,489,463 B2 | 7/2013 | Sen et al. | |
| 8,589,292 B1 | 11/2013 | Huberman et al. | |
| 8,825,618 B2 | 9/2014 | Martin, Jr. et al. | |
| 2002/0131404 A1* | 9/2002 | Mehta | G06F 8/61 370/352 |
| 2008/0275772 A1* | 11/2008 | Suryanarayana | G06Q 30/00 705/14.66 |
| 2010/0114739 A1* | 5/2010 | Johnston | G06Q 30/06 705/26.1 |
| 2011/0252031 A1* | 10/2011 | Blumenthal | G06Q 30/02 707/733 |
| 2011/0295694 A1 | 12/2011 | Coggeshall et al. | |
| 2012/0011031 A1 | 1/2012 | Lewis et al. | |
| 2012/0089485 A1* | 4/2012 | Williams | G06F 8/61 705/26.61 |
| 2012/0166308 A1* | 6/2012 | Ahmed | G06Q 20/12 705/26.41 |
| 2012/0323741 A1 | 12/2012 | Rangachari et al. | |

(Continued)

OTHER PUBLICATIONS

Matthew Flamm; "The Yext big thing in search?", Apr. 1, 2013; Crain Communications Incorporated (Year: 2013).*
"Windows Azure Marketplace", Microsoft, Jun. 2011, pp. 1-15.

*Primary Examiner* — Naeem U Haq
*Assistant Examiner* — Norman Donald Sutch, Jr.
(74) *Attorney, Agent, or Firm* — Robert C. Kowert; Kowert, Hood, Munyon, Rankin & Goetzel, P.C.

(57) ABSTRACT

A network-based data discovery and consumption coordination service may provide data set listings for purchase offered by respective data vendors. The data discovery and consumption coordination service may provide listings in response to search requests based on various search criteria, as well as various filtering techniques based on user reviews, ratings, and other user purchase history for data set listings. The data discovery and consumption coordination service may receive a purchase request via a network-based interface for the service. Data consumption resources which may consume a purchased data set may also be identified via the network-based interface for the data discovery and consumption coordination service. The data discovery and consumption coordination service may direct the transfer of the data set for the purchased data set listing to the identified data consumption resource.

20 Claims, 13 Drawing Sheets

(56) References Cited

U.S. PATENT DOCUMENTS

| | | |
|---|---|---|
| 2012/0323750 A1 | 12/2012 | Sivaramakrishnan et al. |
| 2013/0110675 A1 | 5/2013 | Bouw |
| 2015/0221024 A1* | 8/2015 | Sirsi ................ G06Q 30/08 705/26.3 |
| 2016/0019636 A1* | 1/2016 | Adapalli ............ H04L 47/70 705/26.62 |

* cited by examiner

United States Patent US 10,885,565 B1

NETWORK-BASED DATA DISCOVERY AND CONSUMPTION COORDINATION SERVICE

BACKGROUND

Applications, business, services, operations and systems are increasingly becoming data driven. Organizations may try to collect data for various applications, but organizations cannot always obtain the data they desire. Some organizations, such as small-scale businesses or operations, do not have the resources to implement large scale data collection or aggregation operations. Moreover, even large organizations cannot be privy to all of the data sources from which they may wish to obtain information. Instead, organizations may have to procure desired data from somewhere else. Data providers will often sell, rent, lease, or provide subscriptions to data sets. While many different organizations, companies, systems, and other data providers are active in collecting diverse types of data, the data providers themselves are disaggregated. It is difficult, for instance, to compare similar data provider offerings and make an informed decision as to which data provider offers a better product. Equally challenging for data consumers, is the process of navigating the various interfaces, procedures, protocols or other techniques to obtain data that has already been purchased.

Figure 1:
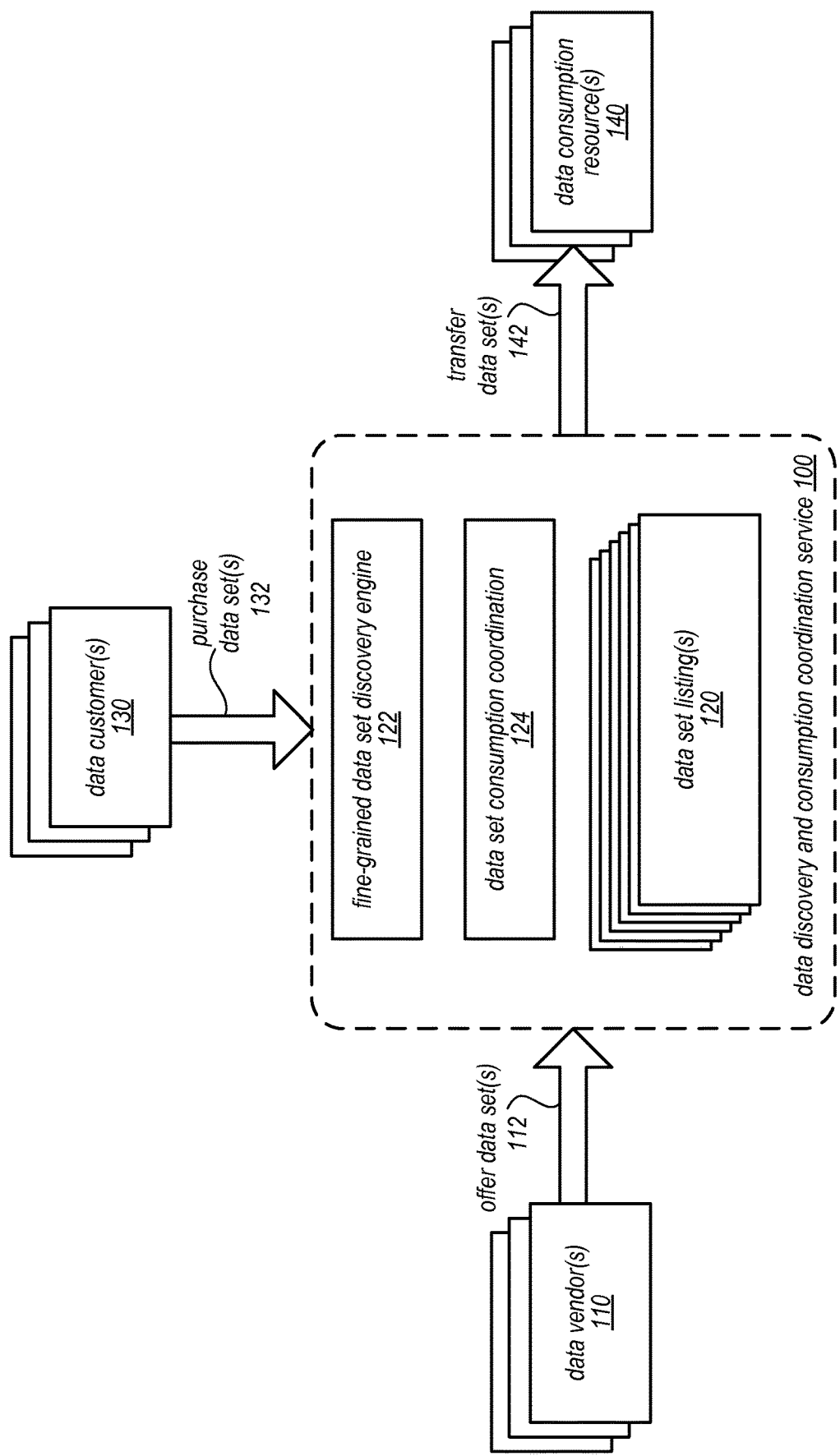
FIG. 1 is a diagram illustrating a network-based data discovery and consumption coordination service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a network-based data discovery and consumption coordination service, according to some embodiments. Data sets may enrich or undergird applications, analysis, services, functions or any other type of system or application. These systems or applications may rely upon data that is obtained by the system or application, or from third-party sources. Oftentimes specialized data may be collected by a particular data provider or data vendor that has visibility of, or access to, various data sources for the specialized data. For example, scientific organizations may monitor various types of natural phenomena and collect data (e.g., climate data, earthquake data or astronomic data). Various types of data may be collected or aggregated (e.g., industrial, consumer, scientific, financial or news) into data sets, which may be accessed or consumed for the different systems and applications mentioned above.

Locating the right kind of data often proves difficult. Data aggregators, collectors, providers, or other type of data vendors may specialize in the types of data provided, resulting in many different sources for information. For example, some government organizations may track specific types of demographic information at a wide scale (e.g., national health statistics), while other government organizations may collect or provide data for a specific region or locality (e.g., county health organization). Financial services companies may track information for particular industries or financial markets as a whole, while specific industry associations or regulatory groups may provide more detailed financial information for a specific subset of corporations in an industry or market segment. Thus, determining a source for particular information is challenging when the scope or scale of data in a data set may vary from source to source, even if the data sources generally provide the same type of information. Nor is it easy to locate data providers as they may be disparate and advertise their data offerings in different ways. Moreover, if multiple types of data are utilized (e.g., for complex or sophisticated analysis or application) these discovery problems may be compounded.

Even when desired data is discovered, there may be little information for potential consumers or purchasers of the data to evaluate both the data itself (e.g., accuracy) as well as the provider of the data (e.g., easy to purchase or reliable delivery). Additionally, each data provider may perform data transfer, access or use differently, increasing costs to utilize multiple data sources. A network-based data discovery and consumption coordination service may provide access to many different data sets, sources and/or data vendors, as well as coordinating the consumption of those data sets for consumers. FIG. 1 is a diagram illustrating a network-based data discovery and consumption coordination service, according to some embodiments.

Figure 11:
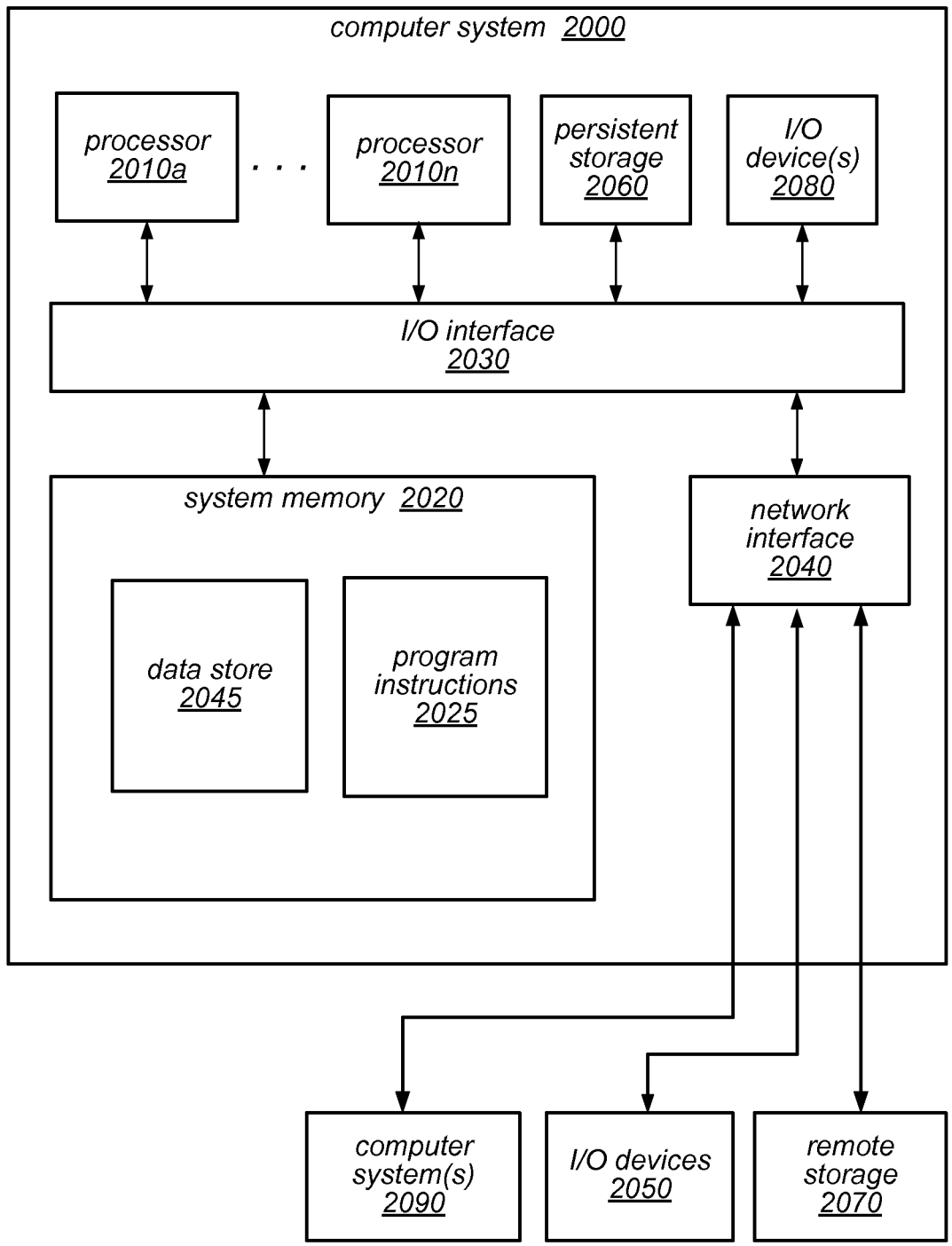
FIG. 11 is a block diagram illustrating an example computing system, according to some embodiments.

Data vendor(s) 110 may be systems or devices, such as computing system 2000 described below with regard to FIG. 11. Data vendors may collect and/or provide various types of data for their own as well as other entities consumption. Collected data may be organized into various data sets, which may be data objects that store a specified set of information, in some embodiments. Data vendor(s) 110 may collect data for multiple data sets or a single data set. Data sets may be in a particular format (e.g., table format) and may be stored/updated as a data file or volume by data providers or vendors. Additionally collected data related to a data set may be added to update a data set. In some embodiments, a data set may be a data stream or feed that provides periodic or aperiodic updates/additions of data to a data set. In some embodiments, data vendor(s) 110 may be acting as selling/leasing agents for data collected by another entity. Data vendor(s) 110 may, in some embodiments, obtain data sets from multiple different data sources which may use data vendor(s) 110 as the leasing/selling agent for the data sets.

As illustrated in FIG. 1, data discovery and consumption coordination service may facilitate the discovery of data sets which data vendor(s) 110 may wish to offer to consumers, as well as coordinate the purchase and consumption of the data sets by data customer(s) 110. Data vendor(s) 110 may offer data set(s) 112 via data discovery and consumption coordination service 100, instead of (or in addition to) offering them via a vendor specific platform. Data discovery and consumption coordination service 100 may perform various vetting and/or validation techniques on data vendor(s) 110 and the data set(s) offered 112, such as discussed below with regard to FIG. 9.

Data discovery and consumption coordination service 100 may maintain data set listing(s) 120 for the data which may be easily searchable by data customer(s) 130, providing information useful for evaluating whether a particular data set should be purchased (e.g., including various descriptive information about the data set, format, type of data, time period associated with the data set, pricing information, ratings or reviews). Data discovery and consumption coordination service 100 may implement a fine-grained data set discovery engine 122, in various embodiments. Fine-grained data set discovery engine 122 may be implemented to analyze the various descriptive information about the data set listings provided by data vendor(s) 110 as well as other data obtained from the actions of data customer(s), such as user purchase history, user ratings or reviews, or any other data or information related to the data sets. For example, in various embodiments, data customer(s) 130 may request data set listings(s) 120 according to one or more search criteria (e.g., key words) which may identify particular data desired (e.g., "daily weather data, Seattle, Wash., July 2010). Fine-grained data set discovery engine 122 may evaluate information for the data set listings 120 to identify a data set listing(s) that may provide the requested information, and provide the data set listing(s) back to data customer(s) 130. Information, such as user ratings of data sets, or the purchases of other users may be used to refine data set listings provided to a customer listing request, such as discussed below with regard to FIG. 10. As multiple different types of data may be listed at data discovery and consumption coordination service 100, data set listings 120 may provide a centralized and easily discoverable view of different data sets for purchase by data customer(s) 130.

Data customer(s) 130 may select data sets to purchase, and send purchase requests for data set(s) 132 to data discovery and consumption coordination service 100. In various embodiments, data discovery and consumption coordination service may implement a network-based interface (e.g., a programmatic interface or graphic interface, such as a web site interface) via which customers may browse, search, select, purchase and/or consume data sets. For example, purchase requests for data set(s) 132 may be sent via an API call or selecting a particular user interface element at a website for data discovery and consumption coordination service 100. Data customer(s) 130 may also indicate or identify data consumption resource(s) 140 for a purchased data set. These data consumption resource(s) 140 may be identified via the same network-based interface used for handling purchase requests. For example, FIGS. 6A and 6B discussed below illustrate how particular consumption resources may be selected to receive purchased data sets via a graphical network-based interface. In at least some embodiments, both the purchase of a data set listing 120 and launch of consumption resource(s) 140 to consume a data set corresponding to the listing may be performed as part of the same transaction and/or purchasing request.

Data discovery and consumption coordination service 100 may implement data set consumption coordination 124 to direct the transfer 142 of purchased data sets corresponding to purchased data set listings to identified data consumption resource(s) 140 for a data customer 130. For example, data set consumption coordination 124 may provision and launch computing resources to receive a transferred data set from data vendor(s) 110. Data discovery and consumption coordination service 100 may provide access credentials to data vendor(s) 110 to transfer data to a pre-existing computing system or resource, which may be running an analytics tool or database to analyze or provide access to the data. In some embodiments, data discovery and consumption coordination service 100 may be implemented as part of a provider network that also provides many other network-based services, such as discussed below with regard to FIG. 2.

Data consumption resource(s) 140 may be services, such as computing services, storage services, analysis services, or various other services which may consume (e.g., store, process or manipulate) a purchased data set, in some embodiments. Consumption resources 140 may operate as part of a same user account for a provider network as associated with the data customer 130 that purchased a data set, or as part of an independent or third party resource. In some embodiments, data sets purchased from data discovery and consumption coordination service 100 may be transferred and/or consumed without downloading the data directly to a data customer 130. Data discovery and consumption coordination service 100 may, in some embodiments, bundle data set listing(s) 120 with software listings to be purchased together. The software listings may be recommended to data customer(s) 130 when purchasing a particular data set.

In various embodiments, data validation and consumption coordination service 100 may collect data tracking data customer(s) 130 purchases and provide various reporting or analytics features to data vendor(s) 110. For example, in some embodiments, common types of customers may be identified to a data vendor 110, in order to provide targeted marketing campaigns for data sets to particular data customers 130. Purchase information may also be used to refine search results for data customer(s) 130 requests for listings, as well as to recommend other data set listing(s) 120 for purchase.

Please note that previous descriptions are not intended to be limiting, but are merely provided as an example of data discovery and consumption coordination service, data vendors and/or data customers. Various arrangements or other examples of these systems, as well as other components may offer data sets to be listed, request data set listings, select data set listings for purchase, direct transfer of a data set for consumption and/or different data consumption resources. Other differences, for example, such as the number of data vendors, data set listings, data customers and/or data consumption resources may also be different than illustrated in FIG. 1.

This specification begins with a general description of a provider network, which may implement a data discovery and consumption coordination service. Then various examples of the data discovery and consumption coordination service are discussed, including different components/modules, or arrangements of components/module that may be employed as part of implementing the data discovery and consumption coordination service. A number of different methods and techniques to implement a data discovery and consumption coordination service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
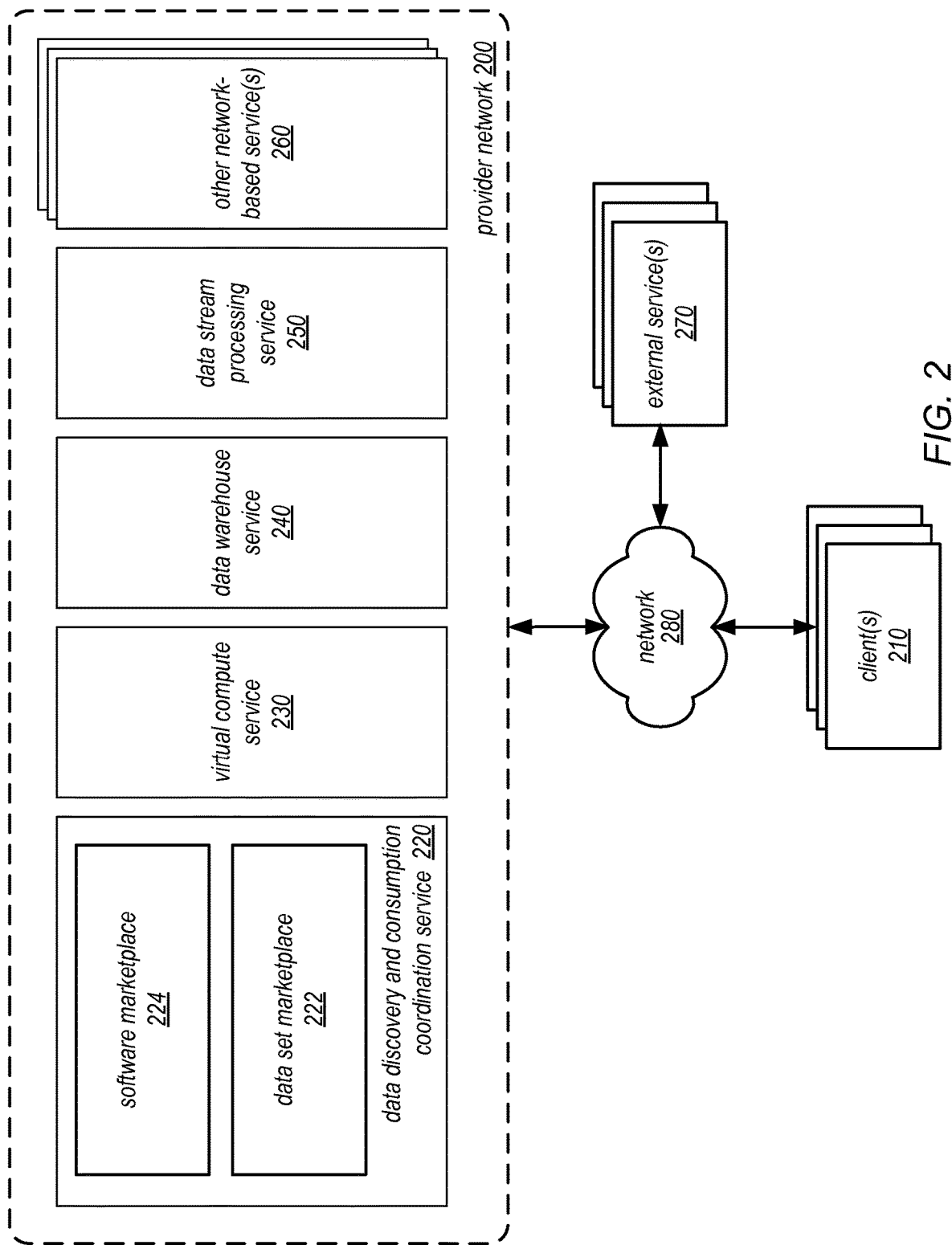
FIG. 2 is a block diagram illustrating a provider network that includes a network-based data discovery and consumption coordination service and other network-based services, according to some embodiments.

FIG. 2 is a block diagram illustrating a provider network that includes a data discovery and consumption coordination service and other network-based services, according to some embodiments. Provider network 200 may be a provider network set up by an entity such as a company or a public sector organization to provide one or more services (such as various types of cloud-based computing or storage) accessible via the Internet and/or other networks to clients. Such a provider network may include numerous data centers hosting various resource pools, such as collections of physical and/or virtualized computer servers, storage devices, networking equipment and the like, needed to implement and distribute the infrastructure and services offered by the provider network 200. The resources may in some embodiments be offered to clients in units called "instances," such as virtual or physical compute instances or storage instances or "clusters," such as a group of virtual or physical compute nodes. Resources may also be provided using a Software as a service (SaaS) model, which may accept or receive various data and/or input and return various data or other output. Provider network 200 may also utilize the resources to offer a network-based marketplace of various services, products, or other offerings.

As illustrated in FIG. 2, provider network 200 may implement network-based data discovery and consumption coordination service 220. Data discovery and consumption coordination service 220 may include many different types of offerings, such as data set marketplace 222 and software marketplace 224. Data discovery and consumption coordination service 220 may help customers find, buy, and immediately start using software, data and services they need to build products and/or run their businesses. As noted above, data discovery and consumption coordination service 220 may be able to provision, launch, configure and/or provide consumption tools, such as analytic programs, for data sets purchased via data set marketplace 222, at the same time and/or via the same network-interface. Data discovery and consumption coordination service 220 may leverage other network-based service resources in provider network 200, such as virtual computer service 230, data warehouse service 240 and data stream processing service 250 to provide consumption resources for a purchased data set and/or to direct the transfer of a data set.

In at least some embodiments, software and data set listings may be offered with many different types of pricing schemes or billing models. For example, subscription schemes that provide a particular amount of time or access to a data set or software may be implemented. Some data sets or software may be permanently purchased or owned outright. In some embodiments, data sets or software may be listed with a billing rate which may allow customers to pay for the software or data set as it is used (e.g., pay as you go). Discovery data and consumption coordination service 220 may, in some embodiments, link billing and payments to user accounts associated with provider network 200. For example, purchases made via data discovery and consumption coordination service 220 may occur on a same bill as charges for a user account usage of virtual computing service 230, data warehouse service 240, data stream processing service 250, as well as other network-based services 260.

Software marketplace 220 may offer for purchase, lease or rent various types of software, in some embodiments. For instance, software marketplace 220 may include databases, application servers, testing tools, monitoring tools, content management, and business intelligence software. Software listings may be provided from well-known software vendors. In some embodiments, data discovery and consumption coordination service 220 may include software that is open source and/or commercial. Software listings may be available for use when purchased in various ways, such as a machine image or as Software as a Service (SaaS). A machine image may be an image of a system, including an Operating System and often additional software (e.g., analytics tools) which may be run a computer system or node, such as a virtual compute instance provided by virtual compute service 230. For example, purchase software products may be run on computing resources purchased within a same customer account for provider network 200. In some embodiments, software vendors may update their product with the latest patches and updates, or add different versions of the product. Software marketplace 224 listings may be curated, and thus vetted and validated for user by data discovery and consumption coordination service 220 customers. Although illustrated as part of data discovery and consumption coordination service 220, in some embodiments software marketplace 224 may not be implemented as part of data discovery and consumption coordination service 220.

Network-based marketplace 220 may implement data set marketplace 220, which may be similar to data set marketplace 100 discussed above in FIG. 1. As noted above with regard to FIG. 1, data set marketplace 100 may maintain data set listings data which may be searched by data customer, providing information useful for evaluating whether a particular data set should be purchased. Purchase customers may select data sets to purchase, and send purchase requests for data sets to data discovery and consumption coordination service 220. In various embodiments, data discovery and consumption coordination service 220 may implement a network-based interface (e.g., a programmatic interface or graphic interface, such as a web site interface) via which customers may browse, search, select, purchase and/or consume data sets. Data purchase customers may indicate or identify data consumption resources for a purchased data set. Data discovery and consumption coordination service 220 may direct the transfer of purchased data sets corresponding to purchased data set listings to identified data consumption resource. FIGS. 3-7B, discussed below, provide further discussion on the various capabilities of a data discovery and consumption coordination service.

In some embodiments, provider network 200 may also implement additional network-based services. For example, in some embodiments, provider network 200 may implement a virtual compute service. A virtual compute service may provide client(s) 210 with access to computing resources, which may be referred to as virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the virtual compute service 230 in different embodiments, including general purpose or special purpose computer servers, storage devices, network devices and the like. In some embodiments client(s) 210 or user may be provided direct access to a compute instance, e.g., by giving a user an administrator login and password. Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 210 applications, without for example requiring the client 210 to access an instance. For example, various applications, tools, or frameworks may be implemented on one or more virtual compute instances to analyze a purchased data set from data set marketplace 222, such as a Hadoop cluster performing data analysis on a purchased data set.

Compute instances may be many different types or configurations based on several different dimensions in some embodiments, (and pricing policies associated with different classes may differ. Compute instances, in some embodiments, may be classified based in part on the timing or duration of instance allocations—i.e., on when instances are obtained by clients and when they are released by the clients, such as reserved instances, on-demand instances and spot-instances each with respective pricing policies. In some embodiments, reserved compute instances may be reserved for fairly long periods, such as a one-year term or a three-year term in accordance with the pricing policy, by paying a low, one-time, upfront payment for the instance, and then paying a low hourly rate for actual use of the instance at any desired times during the term of the reservation. Thus, a client 210 that reserved a reserved instance may, by making the long-term reservation, be assured that its reserved instance will be available whenever it is needed.

For those clients 210 that do not wish to make a long-term reservation, the client may instead opt to use on-demand instances (or spot instances). The pricing policy for on-demand instances may allow the client 210 to pay for resource capacity by the hour with no long-term commitment or upfront payments. The client 210 may decrease or increase the resource capacity used, based on application needs, and may only have to pay the hourly rate for the instances used. In some cases the per-hour pricing for on-demand instances may be higher than the hourly rate for reserved compute instances, because the relatively long durations of reservations may provide a more stable revenue stream to the operator of the provider network than the potentially more dynamic revenue stream provided by on-demand instances. Spot instances may provide a third type of resource purchasing and allocation model. A spot pricing policy may allow a client 210 to specify the maximum hourly price that the client 210 is willing to pay, and the virtual compute service 230 may set a spot price for a given set of available compute resources dynamically based on the prices clients are willing to pay and on the number of instances available to support the spot model. If a client's bid meets or exceeds the current spot price, an instance may be allocated to the client 210. If the spot price rises beyond the bid of the client 210 using a spot instance, access to the instance by the client 210 may be revoked (e.g., the instance may be shut down).

In some embodiments, compute instances have different types or configurations based on expected uptime ratios. The uptime ratio of a particular reserved compute instance may be defined as the ratio of the amount of time the instance is activated, to the total amount of time for which the instance is reserved. Uptime ratios may also be referred to as utilizations in some implementations. If a client expects to use a reserved compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In various embodiments, computer instances may act as consumption resources for data sets purchased via data set marketplace. Data discovery and consumption coordination service 220 may be configured to utilize purchased or reserved instances for a user account associated with a particular client that are configured to run various types of analysis or applications that utilize a purchased data set. Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. The previous descriptions is not intended to be limiting, but merely illustrative of the many different configurations possible for a compute instance provided by virtual compute service 230.

In some embodiments, provider network 200 may implement a data warehouse service 240. Data warehouse service 240 may provide one or more data warehouse clusters for handling client 210 data. Data warehouse service 240 may allow users to set up, operate, and scale a data warehouse in a network-based environment. The data warehouse clusters hosted by the data warehouse service 240 may provide an enterprise-class database query and management system that allows users to scale the clusters, such as by sending a cluster scaling request to a cluster control interface implemented by the data warehouse service 240. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. In at least some embodiments, data warehouse clusters may be implemented as consumption resources for data sets purchased from data set marketplace 222 and configured and/or coordinated to consume the purchased data set by data discovery and consumption coordination service 220.

In various embodiments, data warehouse service 240 may provide clients 210 (e.g., subscribers to the data warehouse service provided by the distributed data warehouse system) with data storage and management resources that may be created, configured, managed, scaled, and terminated in response to requests from the storage client. For example, in some embodiments, data warehouse service 240 may provide clients 210 of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

In various embodiments, provider network 200 may implement data stream processing service 250. Data stream processing service 250 may be a fully managed service for real-time processing of streaming data at massive scale. Data stream processing service 250 can collect, and store in real-time hundreds of streams of large amounts of data per hour from a large number of sources (e.g., web site clickstreams, operational logs or digital marketing data) and may enable client(s) 210 to implement applications that process streaming data in real-time. For example, in some embodiments, a data set purchased from data set marketplace 222 may be a data stream, and data discovery and consumption coordination service 220 may be configured to direct transfer of the purchased data stream to data stream processing service 250 to be included in data stream processing for a client. Data stream processing service 250 may provide load balancing, coordination and fault tolerance. Client(s) 210 may provision and configure virtual compute instances from virtual compute service 230 to implement processing applications for data handled for data stream processing service 250, in some embodiments.

Data stream processing service 250 may automatically manage the infrastructure, storage, networking, and configuration needed to collect and process data streams at the level of throughput specified by clients 210. Data stream processing service 250 may synchronously replicate data from data streams, providing high availability and data durability. Data stream processing service 250 may allow client(s) 210 to increase or decrease the capacity of the data streams at any time according to business or operational needs, without any interruption to ongoing stream processing.

Provider network 200 may implement various other network-based services 260, which may also be implemented as consumption resources to receive/consume purchased data sets from data set marketplace 222. For example, other network-based services may include various storage services (e.g., object storage, archive storage), data base services (e.g., relational databases or non-relational databases), or any other computational or processing, such as a map reduce service.

In various embodiments, external services 270 or other systems or devices may be configured to act as consumption resources for data sets purchased via data discovery and consumption coordination service 220. For example, third-party data storage services, analytics platforms, application hosts, database systems, or any other system may receive a purchased data set for consumption. In some embodiments, external service(s) 270 may directly receive a data set from a data vendor without the data itself being hosted or passing through provider network 200, even though the transaction for the data set was performed and data transfer directed via the data discovery and consumption coordination service 220.

Figure 4:
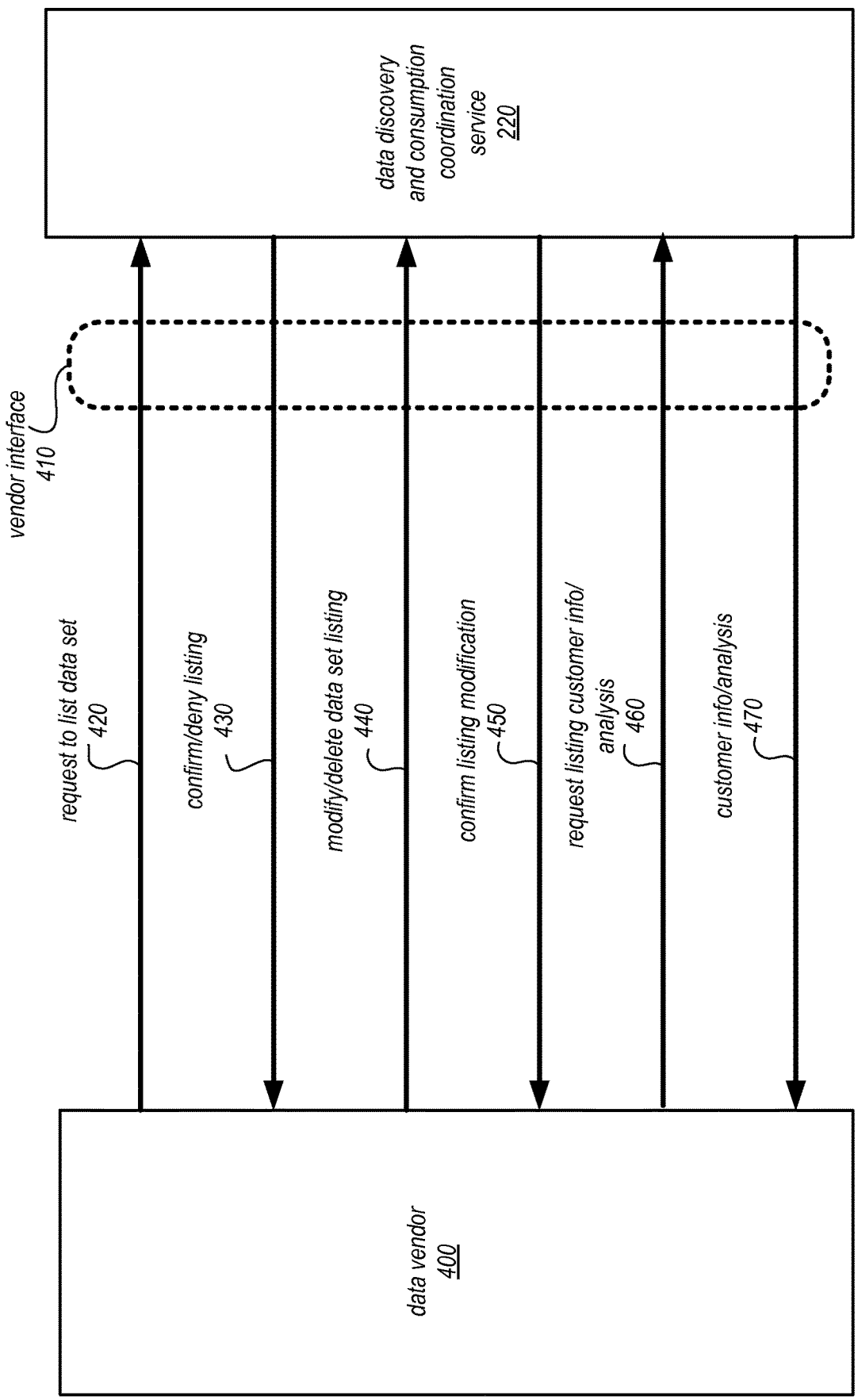
FIG. 4 is a block diagram illustrating various interactions between a data vendor and data discovery and consumption coordination service, according to various embodiments.
Figure 5:
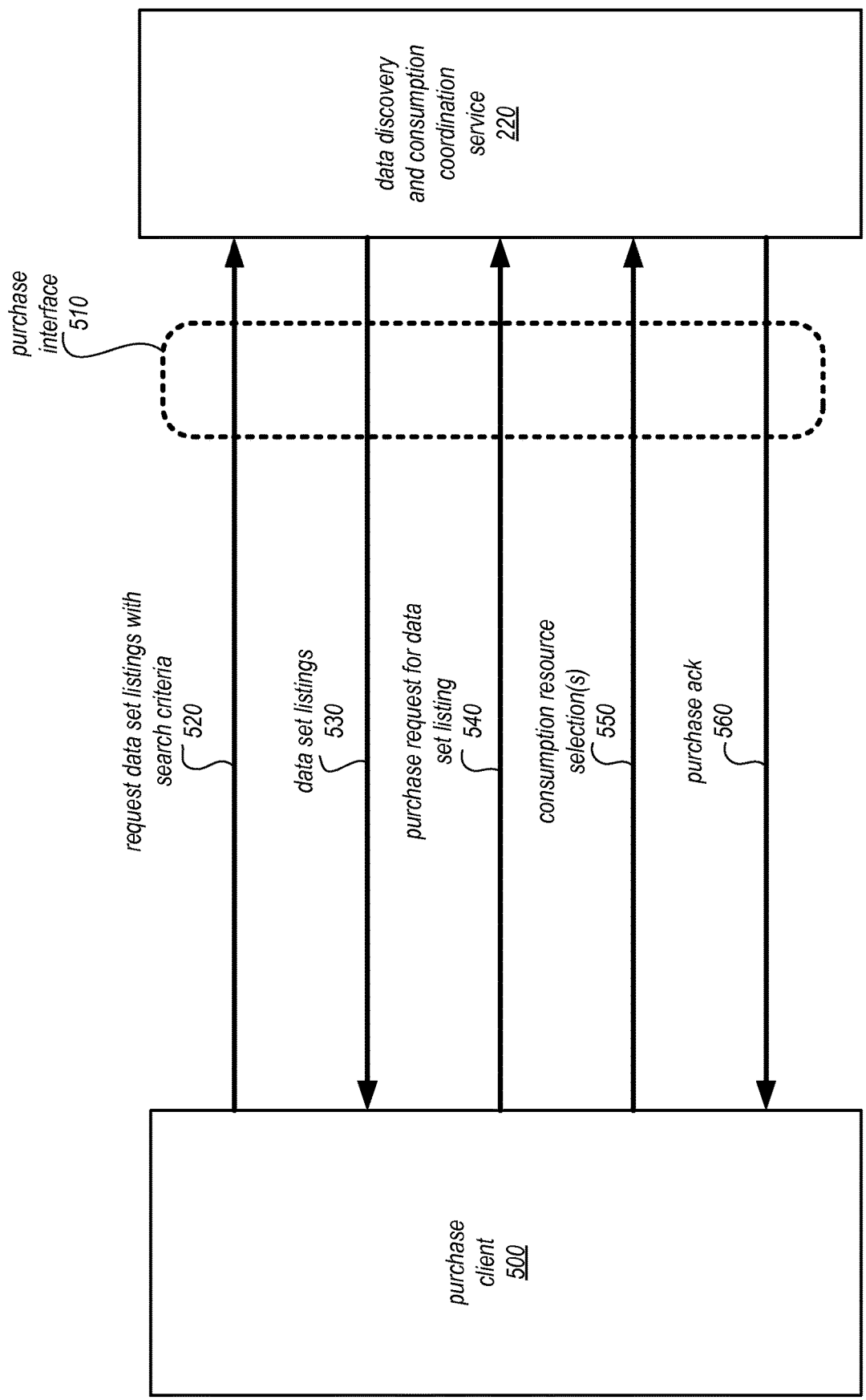
FIG. 5 is a block diagram illustrating interactions between a purchase client and a data discovery and consumption coordination service offering data set listings, according to some embodiments.

Clients 210 may encompass any type of client configurable to submit requests to network-based services of provider network 200. For example, client(s) 210 may include purchase clients for data sets from data set marketplace 222 and/or software from software marketplace 224. Similarly, client(s) 210 may be data vendors listing data sets and/or software vendors listing software via the data discovery and consumption coordination service 220. FIGS. 4 and 5 discussed below provide examples of the various types of interactions that may occur between data vendors, purchase clients, and data discovery and consumption service 220. Client(s) 210 may also be clients of any of the other network-based services, such as virtual compute service 230, data warehouse service 240, data stream processing service 250, and/or other network-based service(s) 260. In some embodiments, a data vendor may have a user account with provider network and store a data set listed at a data set marketplace 222 at data warehouse service or another storage service of provider network 200. Similarly, a purchase client may be associated with a user account that has purchase compute instances from virtual compute service 230, a warehouse cluster from data warehouse service 240 and/or data stream processing from data stream processing service 250.

Clients may be configured to interact with provider network 200 in many ways. For example, a given client 210 may include a suitable version of a web browser, or may include a plug-in module or other type of code module configured to execute as an extension to or within an execution environment provided by a web browser. Alternatively, a client 210 may encompass an application that may make use of the various network-based services in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture.

Clients 210 may convey network-based services requests provider network 200 via network 280. In various embodiments, a network 280 may encompass any suitable combination of networking hardware and protocols necessary to establish network-based communications between clients 210, provider network 200, and external service(s) 270. For example, a network may generally encompass the various telecommunications networks and service providers that collectively implement the Internet. A network may also include private networks such as local area networks (LANs) or wide area networks (WANs) as well as public or private wireless networks. For example, both a given client 210 and provider network 200 may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
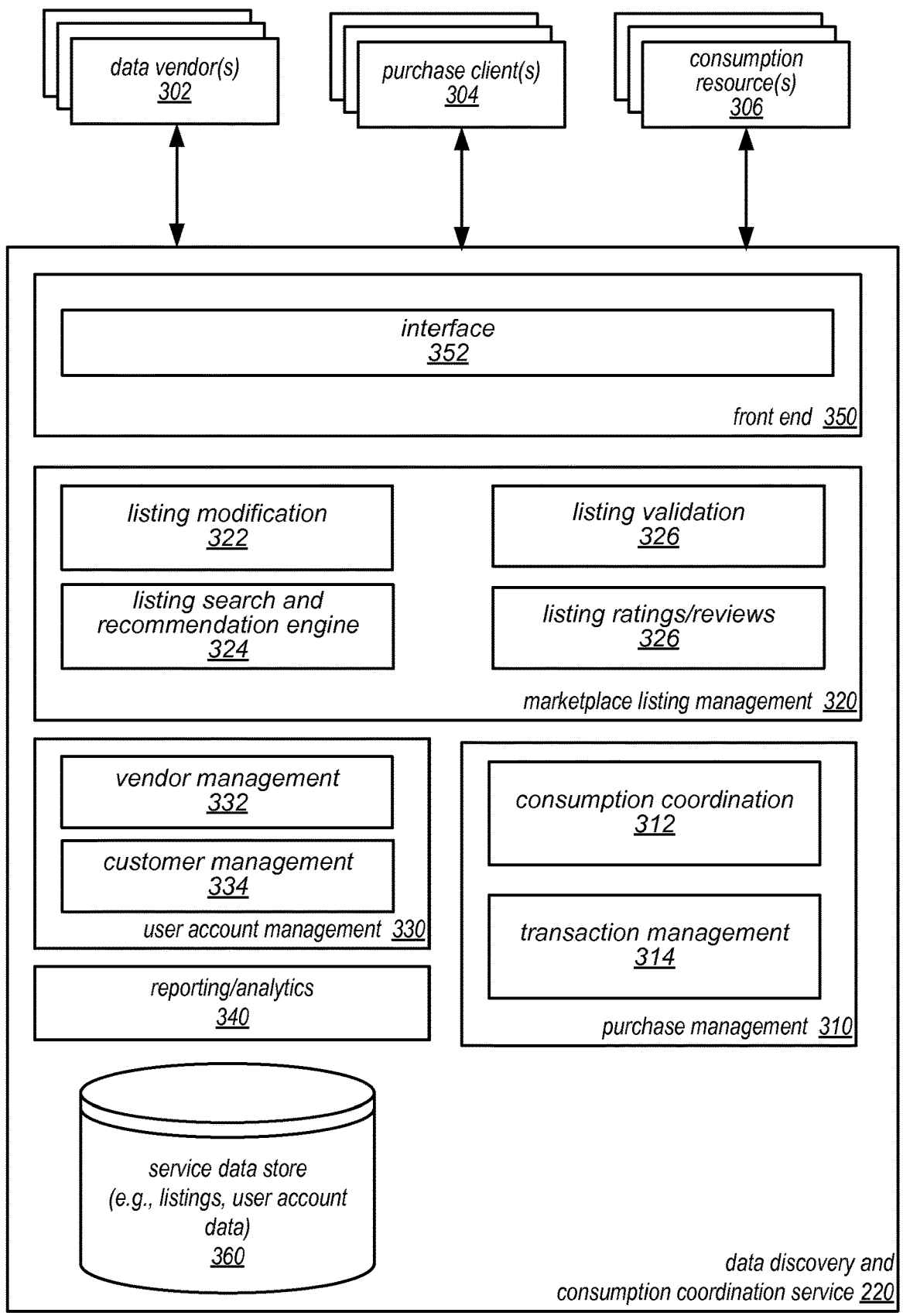
FIG. 3 is a block diagram illustrating a logical diagram of a network-based data discovery and consumption coordination service, according to some embodiments.

FIG. 3 is a block diagram illustrating a logical diagram of a network-based data discovery and consumption coordination service, according to some embodiments. Data discovery and consumption coordination service 220 may implement a front end module 350, in some embodiments. Front end module 350 may receive various requests from data vendor(s) 302 and purchase client(s) 304 via interface 352. Interface 352 may be a network-based interface, configured to receive various requests over a network. Interface 352 may be implemented in multiple ways. For example, in some embodiments, interface 352 may be implemented to receive requests and provide responses programmatically and/or graphically. Front end module 350 may dispatch requests to various other components or modules of data discovery and consumption coordination service 220.

FIG. 4 illustrates various interactions between a data vendor and data discovery and consumption coordination service, according to various embodiments. Vendor interface 410 (e.g., a set of API commands) may be implemented as part of interface 352 in front end module 350, in some embodiments. Data vendor 400 may submit a request to list a data set 420 via vendor interface 410 to data discovery and consumption coordination service 220. The request may include various information about the data set, such as format, type of data, size of data set, collection source, metadata, keywords, descriptions, instructions, pricing or billing scheme information, as well as information about how the data is to be stored, transferred, or otherwise consumed. After applying various validation techniques, a message confirming the listing 430 or denying the listing 430 may be sent via vendor interface 410 back to data vendor 400. Data vendor 400 may also submit various requests to modify a data set listing 440 (e.g., change price information or edit descriptive information about the data set) or delete a data set listing 440 via vendor interface 410 to data discovery and consumption coordination service 220. Confirmation of modifications/deletions 450 may be sent via vendor interface 410 back to data vendor 400.

In some embodiments, data discovery and consumption coordination service 220 may analyze and provide customer information to data vendors, describing the profile or type of customer purchasing a data set listing. Other sales information, or other usage information, such as data sets purchased together may also be included. Data vendor 400 may, in some embodiments, submit a request for a data set listing's customer information/analysis 460 via vendor interface 410. Data discovery and consumption coordination service 220 may provide the information in a response 470 via vendor interface 410 to data vendor 400.

FIG. 5 is a block diagram illustrating interactions between a purchase client and a data discovery and consumption coordination service offering data set listings, according to some embodiments. Purchase interface 510 (e.g., a set of API commands) may be implemented as part of interface 352 in front end module 350, in some embodiments. Purchase client 500 may submit a request for data set listings with search criteria 520 via purchase interface 510 to data discovery and consumption coordination service 220. The search criteria may include various information, including but not limited to, keywords, data format, data vendor, sample query, time period associated with the data set, rating for the data set, pricing information, or any other information which may identify data sets. Data discovery and consumption coordination service 220 may provide data set listings 530 via purchase interface 510 to purchase client 500 based, at least in part on the search criteria.

Purchase client 500 may submit a purchase request for a data set listing 540 via purchase interface 510 to data discovery and consumption coordination service 220. For example, a listing identifier or other information may be included in the purchase request 540. Consumption resource selection(s) 550 may also be sent to data discovery and consumption coordination service 220, in some embodiments, via purchase interface 510. Identification of the consumption resources, (e.g., systems, services, or devices to receive, access or otherwise consume a purchased data set), as well as any needed information to be utilized to coordinate the consumption of the data set at the consumption resources. An acknowledgment of the purchase 560 may be sent back via purchase interface 510 to purchase client 500.

Figure 6A:
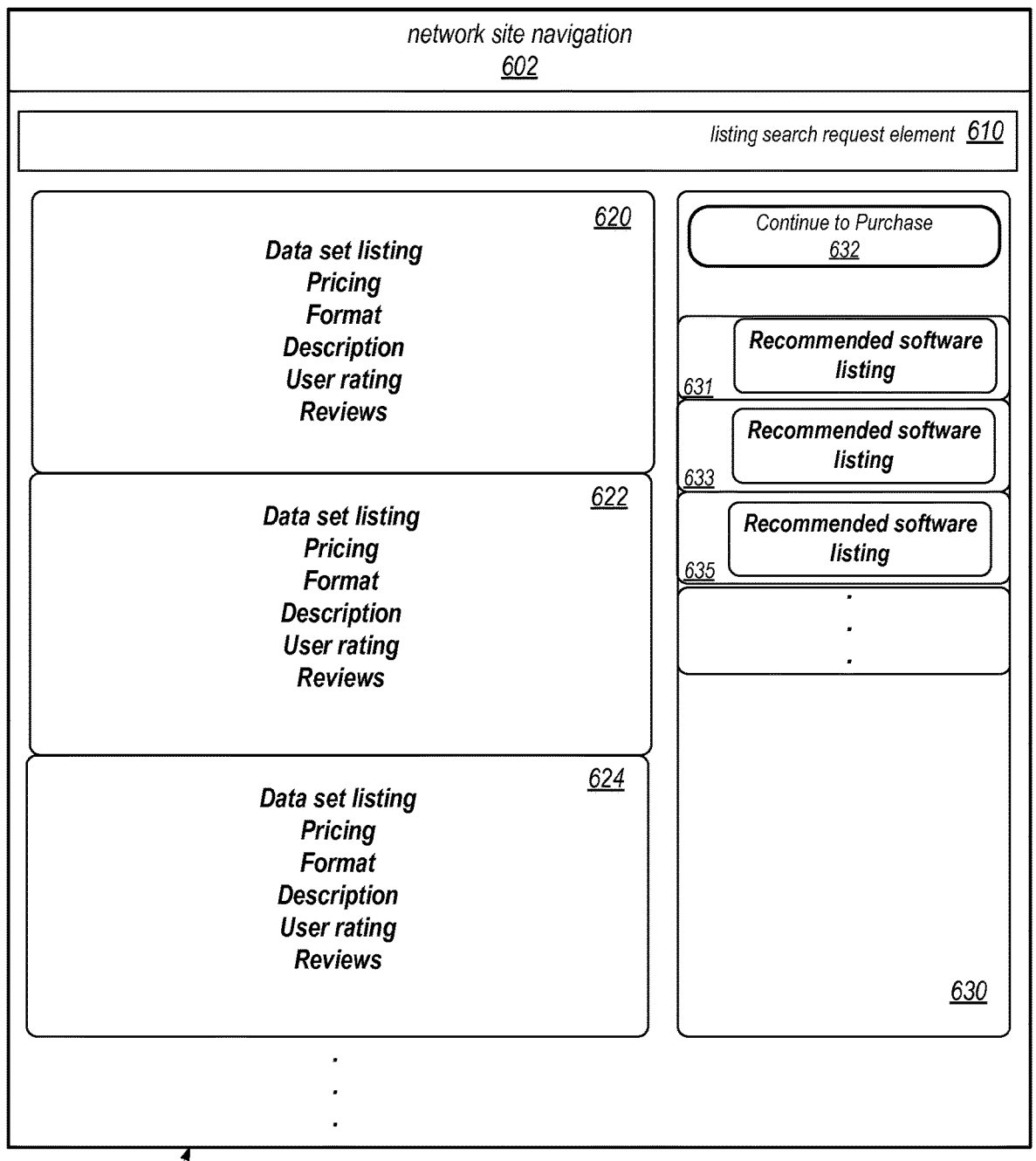
FIGS. 6A-6B illustrate example graphical user interfaces for a network-based interface for a data discovery and consumption coordination service, according to some embodiments.
Figure 6B:
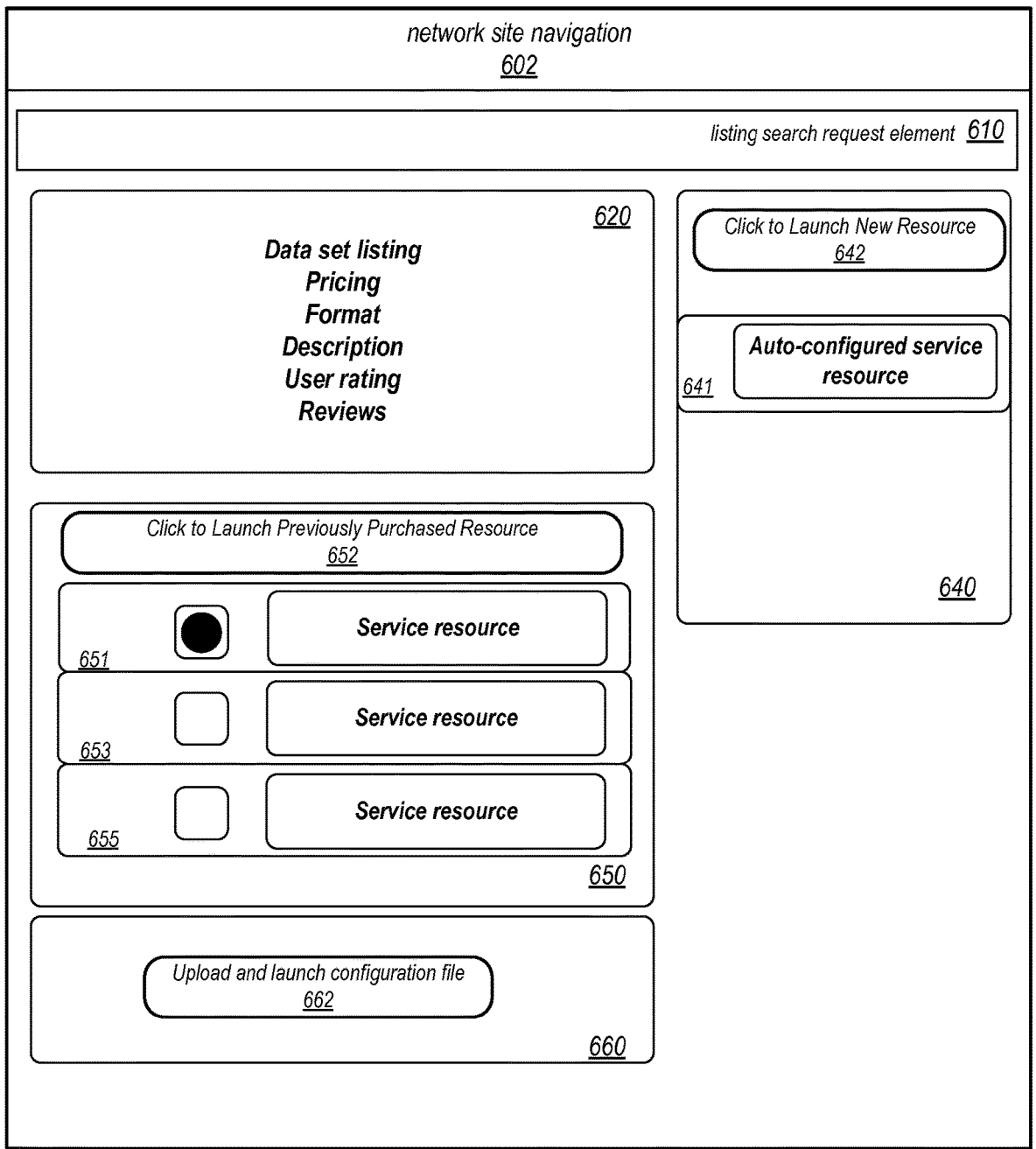

In some embodiments interface 352 may be implemented as a network-based site or graphical interface, which may allow data vendor(s) 302 and purchase client(s) 304 to interact with graphical user interface elements to perform various different requests or actions, or to receive data, listings, or other information back from data discovery and consumption coordination service. FIGS. 6A-6B illustrate example graphical user interfaces for a network-based interface for a data discovery and consumption coordination service, according to some embodiments.

In FIG. 6A, a network-based site 600 implements a graphical network-based interface for data discovery and consumption coordination service 220. Network site navigation bar 602 may allow a browser to navigate to the interface page. Listing search element 610 may allow search requests and search criteria to be submitted. Data set listings that are returned from the search request may be displayed, such as data set listings 620, 622, and 624. One or more of the data set listings may be selected (e.g., via a mouse click) and the "Continue to Purchase" element 632 may also be selected to continue on to the purchase screen illustrated in FIG. 6B. Area 630 of the interface displays recommend software listings 631, 633, and 635 which may be paired with the data set listings provided.

In FIG. 6B, a selected data set listing 620 is displayed. Different options for data consumption resources may be displayed. Area 640 provides an auto-configured service resource 641, which may be a new resource provisioned and launched by selecting click to launch new resource element 642. Area 650 may provide already purchased service resources 651, 653, and 655, that are linked to the user account of the client. One or more may be selected to launch 652 as a data consumption resource. Area 660 may provide an area to upload a configuration file that describes consumption resources to launch and how they should be configured. Selecting element 662 may open a file upload dialog window to initiate the upload of the configuration file and execution of the configuration file.

Please note these are just examples of possible graphical interfaces and are not intended to be limiting.

Turning back to FIG. 3, in various embodiments data discovery and coordination service 220 may implement a marketplace listing management module 320. Marketplace listing management module may handle any changes to listings, as well as analysis, recommendation, or other information derived from listings. Marketplace listing management module 320 may access service data store 360, which may persistently store data set listings in order to perform various functionalities. In some embodiments, marketplace listing management module 320 may implement a listing validation module 326. As discussed below with regard to FIG. 9, data set listings may be validated prior to a listing being offered via data discovery and consumption validation service 220. Various automated techniques for checking listing request information including errors in data set, such as format, type of data, size of data set, collection source, metadata, keywords, descriptions, instructions, pricing or billing scheme information, as well as information about how the data is to be stored, transferred, or otherwise consumed. In some embodiments, validation module 326 may flag a listing for a validation agent for manual review. Validation module 326 may confirm or deny a data set listing to a data vendor.

In some embodiments, marketplace listing management module 320 may implement a listing modification module 322. Listing modification module may be configured to handle any changes to or deletions of listings offered via data discovery and consumption coordination service 220, such as by modifying or removing listings from service data store 360. In some embodiments, marketplace listing management module 320 may be configured to implement listing ratings and reviews module 326. Listing ratings and reviews module may be configured to handle requests to rate or review a particular data set listing. Listing ratings and reviews module 326 may verify that a rating or review is submitted by a user account that actually purchased the data set. Listing ratings and reviews module 326 may update service data store 360 with ratings and reviews.

In some embodiments, marketplace listing management module 320 may implement listing search and recommendation engine 324. Listing search and recommendation engine may be configured to provide listings to a purchase client 304 based on search criteria submitted with a request for listings. For example, the various search criteria (e.g., format, type of data, size of data set, collection source, metadata, keywords, descriptions, instructions, pricing or billing scheme information, as well as information about how the data is to be stored, transferred, or otherwise consumed) may be compared to known information for the data listings in service data store 360. Over time as more searches and purchases are performed, metadata describing each listing may be enhanced with machine learning to better describe the contents of data, types of customers to recommend the data set listing to, or any other behavior related information gleaned from the actions of purchases and data set customers. Preprocessing listing metadata and other descriptive information may allow for recommend listings and search results to be provided in what appears to a customer as real-time results. Candidate data set listings may then be selected from among the listings offered via the data discovery and consumption coordination service 220. As discussed below with regard to FIG. 10, user ratings and/or purchase history for other users may also be used to filter or select listings from the candidate listing to be provided. Various different collaborative filtering and rules or knowledge based recommendation techniques may be applied by listing and search recommendation engine 324. Similarly, listing search and recommendation engine 324 may also be configured to recommend other products or services in conjunction with a particular data set listing. For example, a software tool, or network-based service or resource may be identified for a particular data set and offered for purchase along with the data set. In another example, listing and recommendation engine 324 may indicate other data sets that other customers purchased after purchasing a selected data set. Please note that the following examples are not intended to be limiting as to the types of recommendations or recommendation techniques applied.

In some embodiments, data discovery and consumption coordination service 220 may implement user account management module 330. User account information or data may be stored in service data store 360, and user account management module 330 may be configured to access service data store 360 for user account information. For example, in some embodiments, user account management module 330 may implement a vendor management module 332 which may handle user account information related to data vendors offering data sets via the data discovery and consumption coordination service 220. For example, registration requests for new vendors may be handled (as described below in FIG. 9) by applying various validation techniques. Automated background checks, reports, and other information about a potential data vendor may be obtained. Reports and potential data vendors may be flagged or signaled to a vendor validation agent which may manually investigate and or approve/deny a potential data vendor. Vendor management module 332 may handle payment or account information related to data set listings offered by a data vendor (although in some embodiments this account information may be associated with a user account for a provider network implement data discovery and consumption coordination service 220). Similarly, user account management module 330 may implement a customer management module 334 configured to register, receive, update, and or otherwise maintain user account information for purchasers of data sets via the data discovery and consumption coordination service 220. For example, payment information (e.g., bank accounts, credit cards, or other financial information for payment may be securely and privately maintained in service data store for a user account associated with a customer by customer management module 334.

In some embodiments, data discovery and consumption coordination service 220 may implement reporting and analytics module 340. Reporting and analytics module 340 may be configured to track data listing purchases and generate customer profiles and other reports which may be provided to data vendors, as noted above. Various trends, patterns and/or purchasing behaviors may be identified and provided to both data vendors 302. For example, reporting and analytics module 340 may be able to provide a data vendor with a breakdown of customers by region, spending, industry or any other grouping. Reporting and analytics module 340 may also be configured to adjust listing search and recommendation engine 324's knowledge base or rules in order to update or refine search and recommendation techniques based on new insights gained from purchase data analysis for data listings and users. Reporting and analytics module 340 may apply various different machine learning or similar algorithms to update listing search and recommendation engine, as well as generate more accurate reports for data vendors, in some embodiments.

In some embodiments, data discovery and consumption coordination service 220 may be configured to implement purchase management module 310. Purchase management module 310 may be configured to handle any transaction actions following the purchase of a data set, such as handling the billing for a data set as well as coordinating the consumption of purchased data at data consumption resources, and enforcing time limits or other usage rights for consuming the data. In some embodiments, purchase management module 310 may implement transaction management module 314. Transaction management module 314 may be configured to handle determining a pricing scheme for a purchased data set (e.g., by transaction/access, hourly use, flat fee) and generating billing statements (or reporting data set purchase/usage to other billing to a billing service or management component of provider network 200). Transaction management module 314 may also provide notification to data vendors when data set listings are purchased, as well as the terms (e.g., length of purchase) of the purchase.

In various embodiments, purchase management module may implement consumption coordination module 312. Consumption coordination 312 may be configured to direct the transfer, access, and/or consumption of a data set of a purchased data set listing. Consumption coordination module 312 may configure the consumption resources to receive, access, and/or consume the data set, in some embodiments. Consumption coordination module 312 may be configured to provision, locate, or identify consumption resources for purchase client. For example, in some embodiments, consumption coordination module 312 may be configured to identify consumption resources associated with a user account for the provider network that is also associated with the purchase client and launch, provision, configure or direct the transfer of data to the identified consumption resources. In some embodiments, consumption coordination component may be configured to launch consumption resources as part of the same purchase transaction for the data set. For example, consumption coordination module 312 may automatically select or suggest one or more consumption resources, or software tools (e.g., as may be procured from software marketplace 224) for a data set (e.g., large data set may be sent to a data warehouse cluster or a data stream may be sent to a data streaming service resource) for a purchased data set and direct the transfer of the data set to the automatically selected consumption resources. In some embodiments, a purchase client 304 may still confirm the suggested or selected consumption resources, edit, or provide different consumption resources. In some embodiments, consumption coordination module 312 may be configured to parse a consumption resource template or architecture file, to provision one or more consumption resources for a purchase client. For example, a consumption resource architecture file may describe a data warehouse cluster that is to receive a purchased data set and multiple virtual compute instances to be launched running data processing tools or applications (e.g., denoting specific machine images to be run on each compute instance). In at least some embodiments, consumption coordination module 312 may be configured to enforce access or usage limits for purchased data sets (e.g., specified number of accesses or a specified time period for access). For example, consumption coordination module 312 may embed or implement digital rights management (DRM) controls to be packaged along with a purchased data set when transferred in order to enforce the access or purchase agreement policies for the data set listing.

Figure 7A:
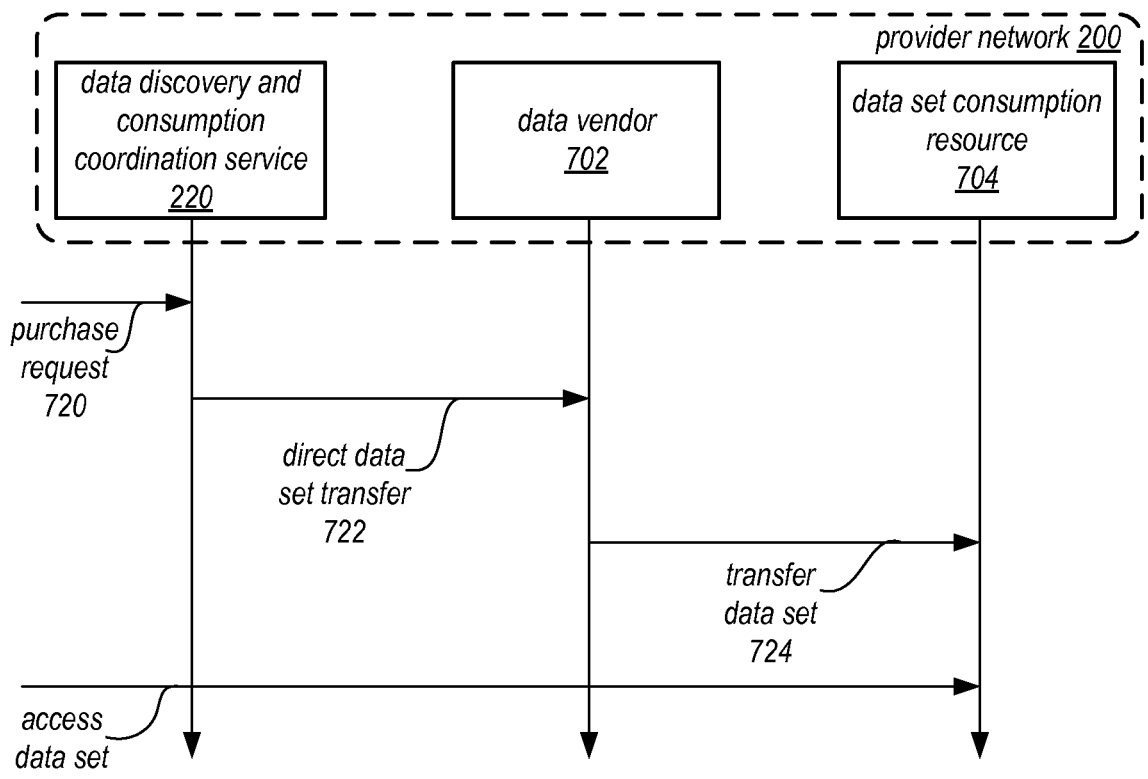
FIGS. 7A-7D, are diagrams illustrating interactions between a data discovery and consumption coordination service, data vendors, and data set consumption resource, according to some embodiments.

Consumption coordination module 312 or another component of data discovery and consumption coordination service 220 may be configured to interact with various consumption resources both internal to a provider network and external to a provider network. FIGS. 7A-7D are diagrams illustrating interactions between a data discovery and consumption coordination service, data vendors, and data set consumption resource, according to some embodiments. In FIG. 7A, a purchase request 720 is received for a data set offered by data vendor 702 at data discovery and consumption coordination service 220. Data set consumption resource 704 is identified via a network-based interface for data discovery and consumption coordination service 220 as a consumer of the purchased data set. Data vendor 702 and data set consumption resource 704 are both implemented within provider network 200. For example, data vendor 702 may be implemented by storing the data set in a data warehouse cluster or data object store in provider network 200. Similarly, data set consumption resource 704 may be an application implemented on or more compute instances or other network-based resource in provider network 200. Data discovery and consumption coordination service 220 may direct transfer of the data set 722 by coordinating with data vendor 702. For instance, as both data vendor 702 and data set consumption resource 704 are in provider network 200, an internal API or data transfer service may be used to transfer the data to the consumption resource. Thus, the data set may be transferred 724 (or made accessible to) data set consumption resource 704. Access or consumption of the data set 726 at the data set at the data set consumption resource 704 may occur, in some embodiments (e.g., if the data set consumption resource is a data store like a database).

Figure 7B:
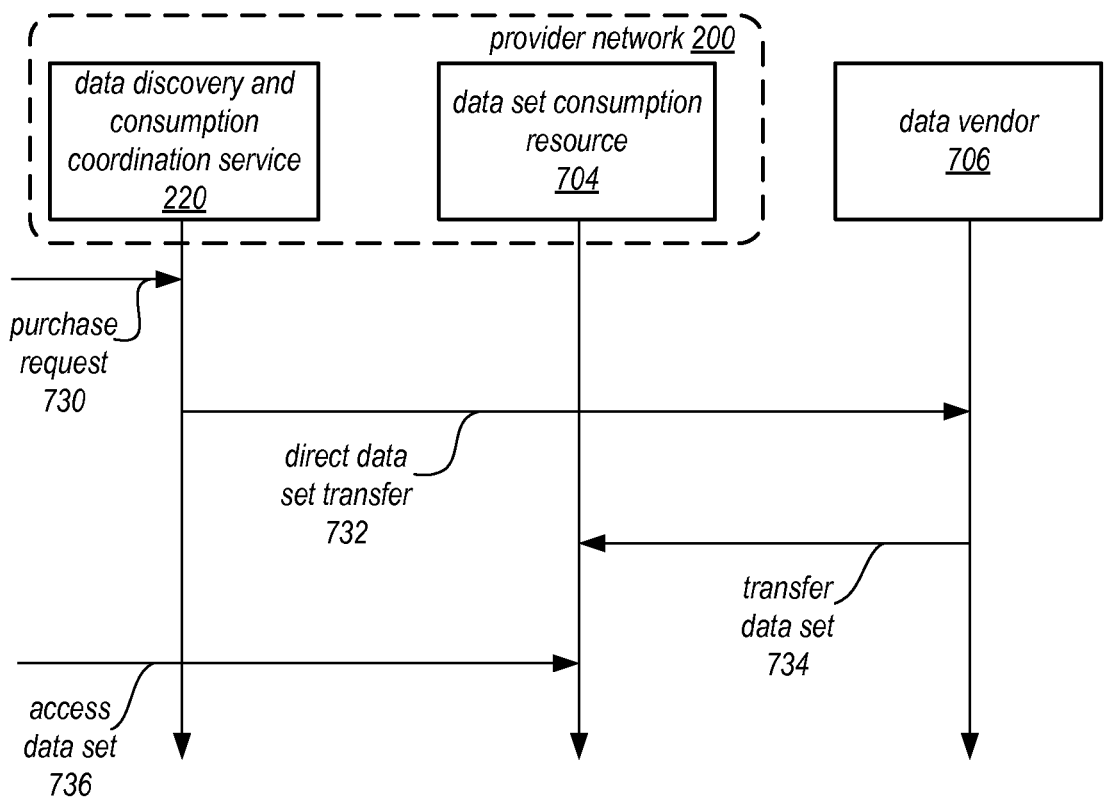

In FIG. 7B, another data set purchase request 730 is received at data discovery and consumption coordination service 220. Data set consumption resource 704 is implemented in provider network 200, but data vendor 706 is not. Data discovery and consumption coordination service 220 may direct the data set transfer 732 from data vendor 706 to consumption resource 704. For example, data discovery and consumption coordination service 220 may provide access credentials, specific api commands, scripts, network-endpoints, or other information that would allow data vendor 706 to transfer 734, make available, or otherwise allow data set consumption resource 704 to consume the data set. For example, if data vendor 706 provides a data stream data set (e.g., financial data stream), then connection information to feed the data stream into a data streaming service resource 704 may be provided. Access or consumption of the data set 736 at the data set at the data set consumption resource 704 may occur, in some embodiments.

Figure 7C:
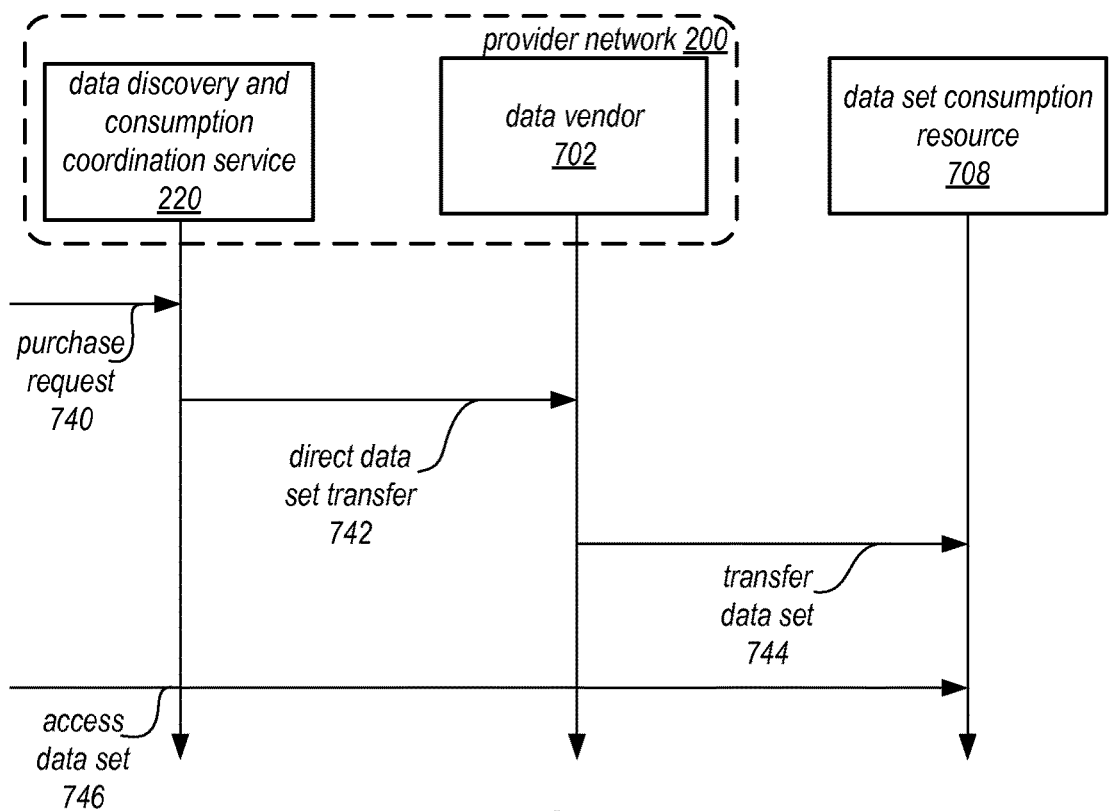

In FIG. 7C, another data set purchase request 740 is received at data discovery and consumption coordination service 220. Data vendor 702 is implemented in provider network 200, but data set consumption resource 708 is not (e.g., a third-party data analysis service). Data discovery and consumption coordination service 220 may direct the data set transfer 742 from data vendor 702 to consumption resource 708. For example, data discovery and consumption coordination service 220 may provide access credentials, specific api commands, scripts, network-endpoints, or other information that would allow data vendor 702 to transfer 744, make available, or otherwise allow data set consumption resource 704 to consume the data set. For example, the purchase request or information identifying the data set consumption resource may include user access credentials or other access instructions to access data set consumption resource 708. Access or consumption of the data set 746 at the data set at the data set consumption resource 708 may occur, in some embodiments.

Figure 7D:
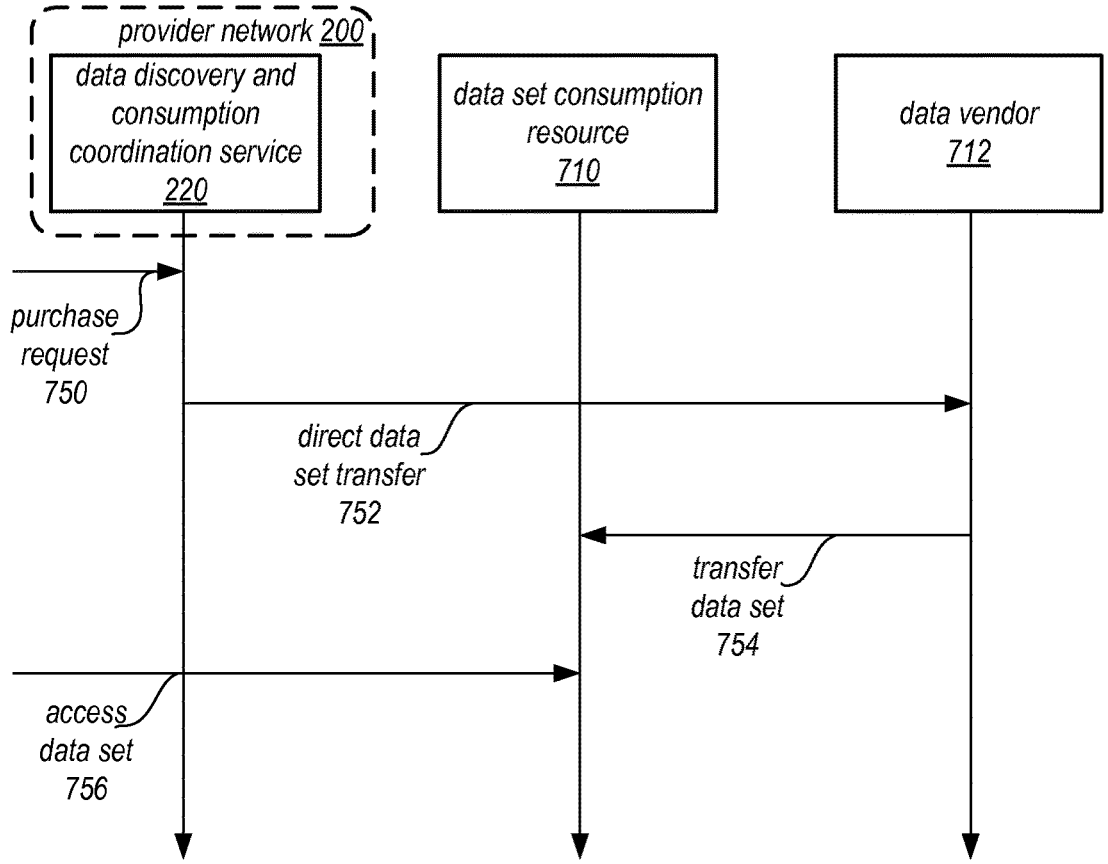

In FIG. 7D, another data set purchase request 750 is received at data discovery and consumption coordination service 220. Data vendor 712 and data set consumption resource 710 are not implemented as part of provider network 200. Data discovery and consumption coordination service 220 may direct the data set transfer 752 from data vendor 712 to consumption resource 710. For example, data discovery and consumption coordination service 220 may provide access credentials, specific api commands, scripts, network-endpoints, or other information that would allow data vendor 702 to transfer 744, make available, or otherwise allow data set consumption resource 704 to consume the data set. As illustrated, in at least some embodiments data sets for some data set listings may not be hosted and or transferred through data discovery and consumption coordination service. Instead, direct communication between data set consumption resource 710 and data vendor 712 may be enabled/coordinated by data discovery and consumption coordination service 220. Access or consumption of the data set 756 at the data set at the data set consumption resource 710 may occur, in some embodiments.

Service data store 360 may be multiple persistent storage devices, such as hard disk drives or solid state drives configured according to various storage formats or systems (e.g., RAID) to provide persistent storage for data discovery and consumption coordination service 220.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment 2000 illustrated in FIG. 11 and described below. In various embodiments, the functionality of a given service system component (e.g., a component of data discovery and consumption coordination service 220, or other services of provider network 200) may be implemented by a particular node or may be distributed across several nodes. In some embodiments, a given node may implement the functionality of more than one service system component (e.g., more than one distributed storage service system component).

Figure 8:
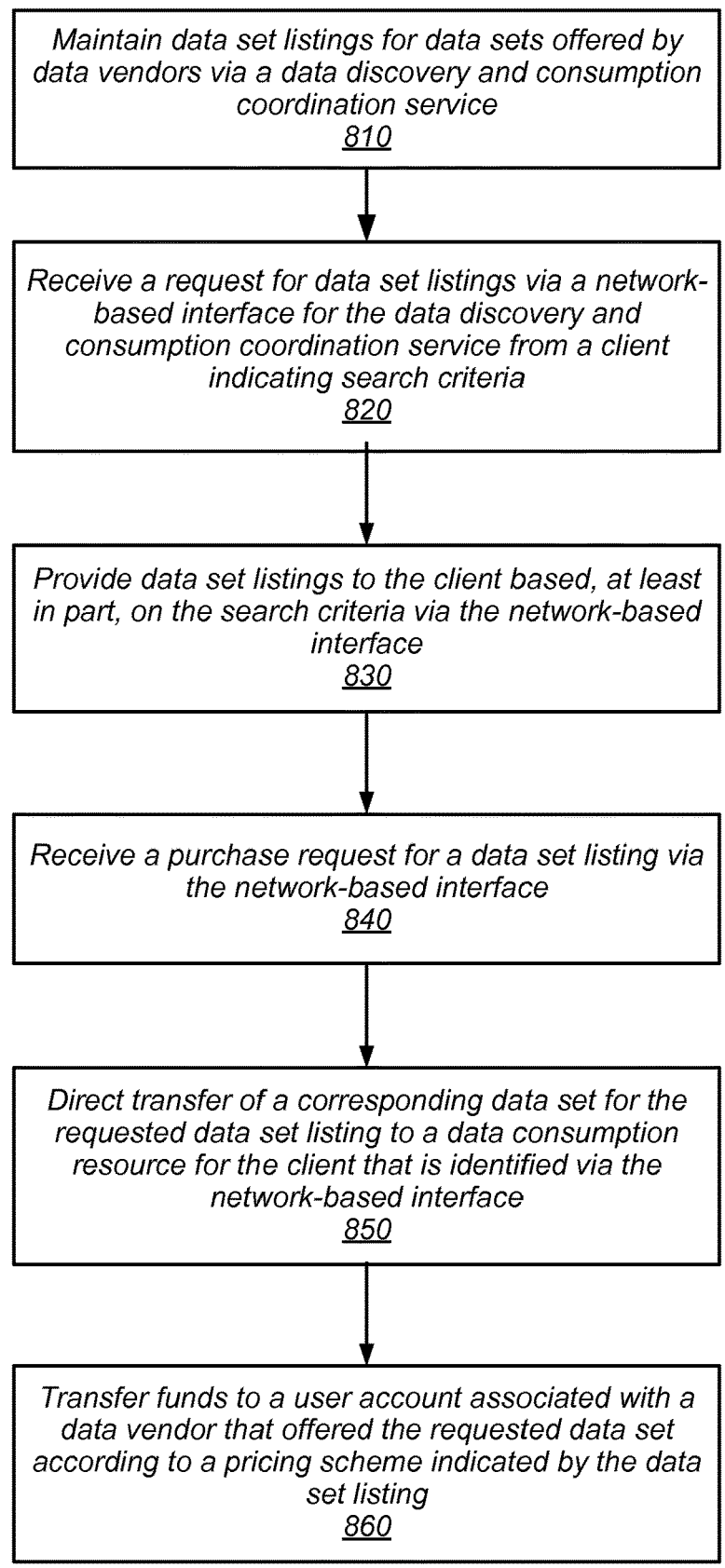
FIG. 8 is high-level flowchart illustrating various methods and techniques for implementing a data discovery and consumption coordination service, according to some embodiments.

The examples of a network-based data discovery and consumption coordination service discussed above with regard to FIGS. 2-7D have been given in regard to a provider network. Various other types or combinations of systems may implement these techniques. For example, a network-based data discovery and consumption coordination service may be a stand-alone service. FIG. 8 is high-level flowchart illustrating various methods and techniques for implementing a data discovery and consumption coordination service, according to some embodiments. These techniques may be implemented using various other network-based service architectures and thus, the previous examples are not intended to be limiting as the type of network-based services that may implement a data discovery and consumption coordination service.

As indicated at 810, data set listings for data sets offered by data vendors via a data discovery and consumption coordination service may be maintained, in various embodiments. A data discovery and consumption coordination service may maintain data set listings from many different types of data sets, from large "Big Data" volumes that are stored across many different storage devices to small data sets that may be stored on a single storage device. Data sets may be formatted in different ways, tables, lists, or other data formats, as well as stored in different configurations (e.g., different data entry delimiters). In some embodiments, data listings may be for a data stream or updating data set, which a data vendor may update as described in the data set listing. Descriptive information for the data set listings, key words, formats, instructions, pricing schemes, ratings and/or reviews may be maintained as part of the data set listings.

Figure 10:
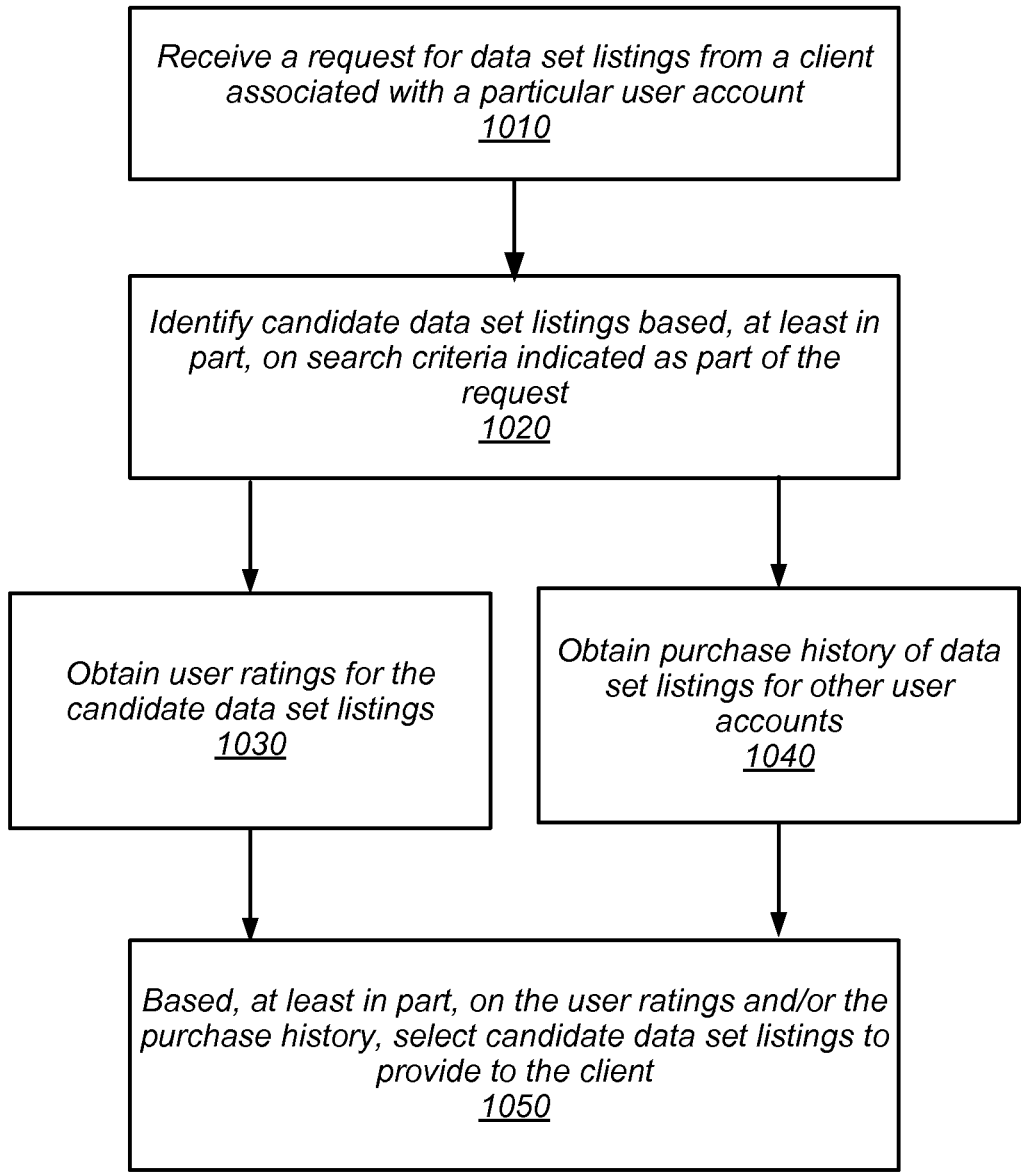
FIG. 10 is high-level flowchart illustrating various methods and techniques for selecting data set listings to provide to a client in response to a search request, according to some embodiments.

As indicated at 820, a search request for data set listings may be received via a network-based interface for the data discovery and consumption coordination service from a client that indicates search criteria. The network-based interface may be a programmatic interface (e.g., API) and/or graphical interface (e.g., a website). For example a search bar may receive as input search criteria which are provided as part of a request for data set listings. In various embodiments, search criteria may include keywords, data format, data vendor, sample query, time period associated with the data set, rating for the data set, pricing information, or any other information which may identify data sets. Data set listings may be provided to the client, based at least in part on the search criteria, via the network-based interface, as indicated at 830 (e.g., data set listing results displayed on a web page). Various different techniques for preprocessing metadata or other descriptive information, either obtained from the data vendor, generated according to data collection and analysis techniques implemented at the data discovery and coordination service, may be implemented in order to quickly provide data set listings (e.g., populate listings in a graphical display as new search terms are added). FIG. 10, discussed in further detail below provides examples of various techniques for selecting data set listings to provide in response to a request for listings.

In some embodiments, metadata or descriptive information provided by a data vendor may be much more descriptive than information displayed to a potential purchaser. For example, if the data set is described as weather data to a client, the metadata provided by a data vendor may specifically list which cities are included in the data set, as well as what time periods are covered. In some embodiments, data vendors may submit information for the data listings which describes how a data set may be preconfigured or prepackaged for a purchaser (e.g., out of the larger weather data set, a smaller set of data for a particular city at a particular time period may alone be provided or accessed at a corresponding price). In at least some embodiments, customized data set listings may be generated at the data discovery and coordination service for a client, and provided to a client as one of the data set listings. For example, if search criteria include two distinct types of data (e.g., sales data for a particular city and weather data for a particular city), data discovery and consumption coordination service may combine the two types of data into a single data set listing. Special access mechanisms or consumption mechanisms may generated (e.g., a customized API) or provided to the client to access the customized data set listing if purchased.

As indicated at 840, a purchase request for a data set listing may be received via the network-based interface. The purchase request may identify the particular data set listing to be purchased, a user account or other information to facilitate payment, as well as any security tokens or credentials sufficient to verify the identity of the purchasing client. In some embodiments, data consumption resources may be identified via the same network-based interface for consuming the purchased data. In some embodiments, a script, template, architecture or other file that describes a configuration for provisioning, launching and/or executing data consumption resources may be provided. For example data consumption resources may be virtual compute instances, data warehouse clusters, data streaming processing service resources, or other network-based service resource implemented as part of a same provider network or service platform as data discovery and consumption coordination service. The configuration file may identify one or more of these resources, and be executed to prepare and begin data consumption of the purchased data set (e.g., launch certain applications, begin transferring data set to a storage location, or any other type of access, transfer, or consumption of the data set). External systems or devices may also be identified as data consumption resources, in some embodiments.

As indicated at 850, in various embodiments transfer of the corresponding data set for the purchased data set listing to one or more data consumption resources may be directed, in response to receiving the purchase request. As noted above the data consumption resources may be identified via the same network-based interface as the purchase request (e.g., same web page interface or API). The data discovery and coordination service may provide access credentials, specific api commands, scripts, network-endpoints, or other information that would allow a data vendor offering the data set to transfer, make available, or otherwise allow the data set consumption resource to consume the data set. In some embodiments, data discovery and coordination service may coordinate the data transfer without directly receiving the data at the service or provider network, but may instead coordinate the transfer between two external systems. FIGS. 3 and 7A-7D discussed above provide many more examples of coordinating data transfer of purchased data set for a data consumption resource.

In some embodiments, when a purchase request is received, a one or more other data set listings may be sent as recommendations to a purchasing client (e.g., "users who purchased this data set also purchased X data set"). In some embodiments, recommended software applications, tools, resources, or components for consuming the data set may be sent or provided as offers to the purchasing client for a packaged or combined listing.

As indicated at 860, funds may be transferred to a user account associated with the data vendor that offered the purchased data set according to a pricing scheme indicated in the listing. For example, if the pricing scheme is pay as you go, then funds may be transferred based on the usage of the data set. If the pricing scheme is a fixed cost or time bound, then funds may be transferred based on the fixed cost or time period. In some embodiments, pricing schemes may be transactional and determined based on access to the data. Data discovery and consumption coordination service may assess a transaction fee (e.g., fixed or percentage) for facilitating the purchase and consumption coordination of the data set listing.

Figure 9:
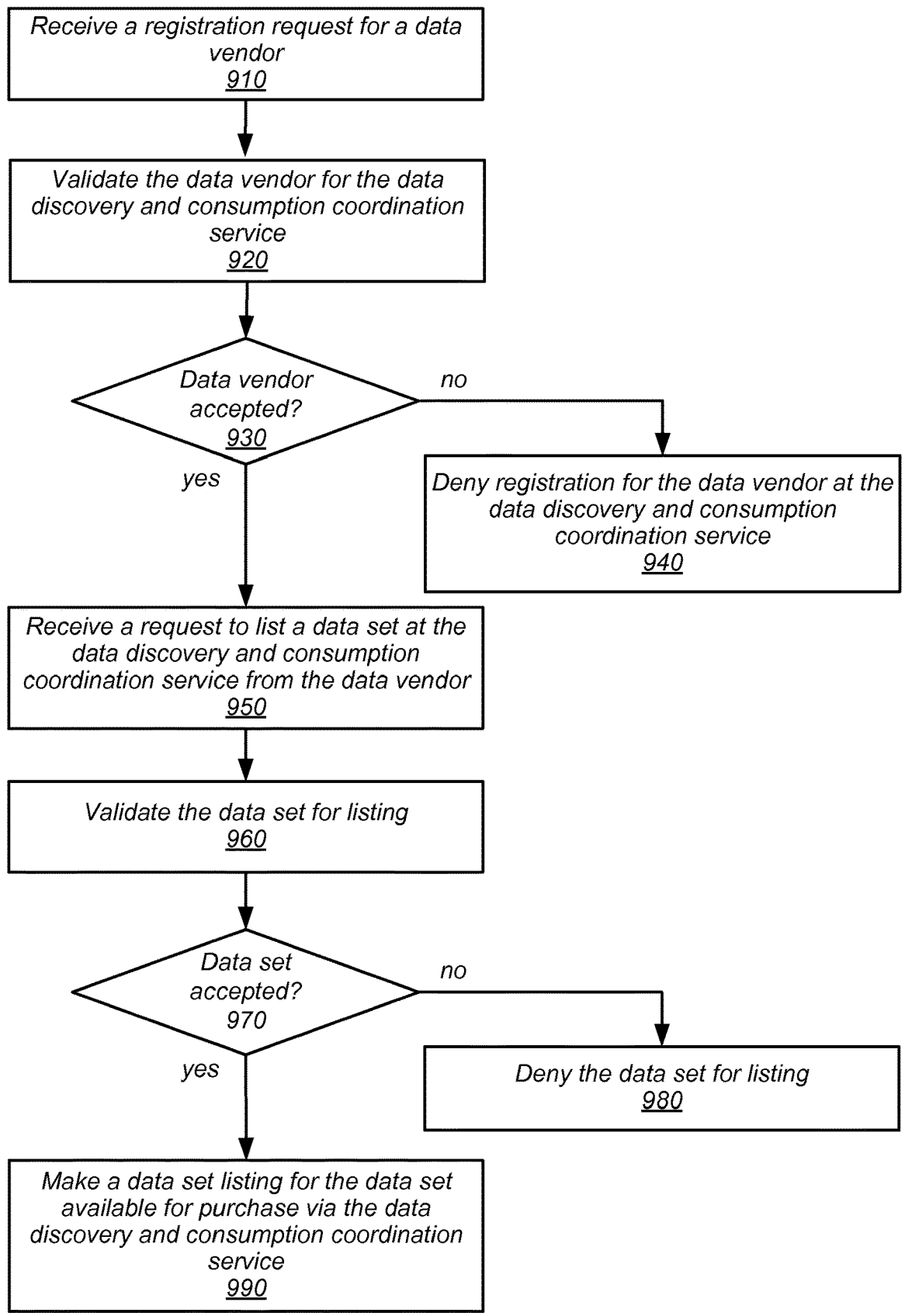
FIG. 9 is high-level flowchart illustrating various methods and techniques for registering data vendors and data set listings for a data discovery and consumption coordination service, according to some embodiments.

FIG. 9 is high-level flowchart illustrating various methods and techniques for registering data vendors and data set listings for a data discovery and consumption coordination service, according to some embodiments. As indicated at 910, a registration request for a data vendor may be received. The registration request may include identification information, potential data sets offered, or any other information necessary to validate the data vendor. As indicated at 920, the data vendor may be validated for the data discovery and consumption coordination service, in some embodiments. Agents may be tasked with investigating the data vendor, various company reports and other information may be accessed in order to validate the data vendor. If the data vendor is not accepted, as indicated by the negative exit from 930, then the registration for the data vendor at the data discovery and consumption coordination service may be denied, as indicated at 940. If the data vendor is accepted, as indicated by the positive exit from 930, then the data vendor may be allowed to list data sets at the data discovery and consumption coordination service.

As indicated at 950, a request to list a data set may be received from the validated data vendor. The request may include various information about the data set, such as format, type of data, size of data set, collection source, metadata, keywords, descriptions, instructions, pricing or billing scheme information, as well as information about how the data is to be stored, transferred, or otherwise consumed. Based on this data, various automated and manual validation techniques may be performed to validate the data set for listing, as indicated at 960. For example, misleading descriptive statements, errors, typos, or any other erroneous information may be flagged for further investigation and/or denial of the listing. If, as indicated by the negative exit from 970, the data set is not accepted, then the data set may be denied for listing. An error message or other information may be sent to the data vendor indicating possible corrections that may be made to allow the data set to be listing, in some embodiments. If, as indicated by the positive exit from 970, the data set is accepted, the data set listing may be made available for purchase via the data discovery and consumption coordination service, as indicated at 990.

FIG. 10 is high-level flowchart illustrating various methods and techniques for selecting data set listings to provide to a client in response to a search request, according to some embodiments. As discussed above with regard to FIG. 8, a request for data set listings may be received that includes search criteria for the request. The request may also be associated with a particular user account. As indicated at 1020, candidate data set listings may be identified based on the various search criteria indicated as part of the request, in some embodiments. For example, various metadata tags for data listings may be searched, as well as user reviews, data provider descriptions, pricing information, or any other information associated with the data listings.

Once candidate data set listings are identified, various different filtering or selection techniques may be performed. For example, in some embodiments, user ratings or scores for the candidate data set listings may be obtained, as indicated at 1030. These candidate set listings may be used to rank or tie-break similar data set listings. In another example, purchase data history for user accounts may be obtained. Collaborative filtering techniques or other comparison techniques may be performed to identify similar users to the purchasing user account, and to determine likelihood scores or other similarity rankings in order to identify those data set listings most likely to be chosen by the purchasing user based on the other user information. Various rule-based or knowledge-based filtering techniques may also be applied. As indicated at 1050, based at least in part on the user ratings and/or the purchase history, candidate data set listings may be selected to provide to the client.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Embodiments of implementing a network-based data discovery and consumption coordination service as described herein may be executed on one or more computer systems, which may interact with various other devices. FIG. 11 is a block diagram illustrating an example computer system, according to various embodiments. For example, computer system 2000 may be configured to implement nodes of a virtual compute instance, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network or network-based services, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of compute nodes, each comprising at least one processor and memory, that collectively implement a network-based data discovery and consumption coordination service of a provider network that offers a plurality of network-based services;
the data discovery and consumption coordination service, comprising:
a persistent data store, configured to maintain a plurality of data set listings as part of the data discovery and consumption coordination service, wherein each data set listing corresponds to a respective data set selectable via a front end module for the data discovery and consumption coordination service, wherein the respective data sets are respective data objects that store different types of data, the data in the respective data objects aggregated from one or more data sources;

the front end module, configured to implement a network-based interface for the data discovery and consumption coordination service;

the data discovery and consumption coordination service, configured to:

receive a request via the network-based interface for data set listings from a client, wherein the request includes one or more search criteria;

in response to receipt of the request for data set listings from the client, access the persistent data store to select one or more data set listings of the plurality of data set listings to provide to the client via the network-based interface, wherein the one or more data set listings are selected based, at least in part, on the one or more search criteria;

receive a request via the network-based interface to select one of the one or more data set listings provided to the client;

in response to the receipt of the request to select the one data set listing:

receive a selection of a resource hosted in one of the network-based services offered by the provider network to execute an application configured to process information in the data stored as the respective data object of the respective data set corresponding to the selected data set listing;

configure the selected resource in the one network-based service to receive the respective data object; and direct a transfer of the respective data object that is the respective data set from a storage location for a vendor of the data set to the configured resource to enable the application to process the information in the data stored in the respective data object that is the data set.

2. The system of claim 1, wherein to select the one or more data set listings of the plurality of data set listings to provide to the client via the network-based interface, the data discovery and consumption coordination service is configured to:

identify a plurality of candidate data set listings based, at least in part on the one or more search criteria;

obtain, at least one of:

respective user ratings for the plurality of candidate data set listings; or data set purchase history for a plurality of users accounts of the data discovery and consumption coordination service; and based, at least in part, on the respective user ratings or the data set purchase history for the plurality of user accounts, select from the plurality of candidate data set listings the one or more listings to provide to the client.

3. The system of claim 1, wherein the data discovery and consumption coordination service is further configured to validate the respective data set corresponding to the selected data set listing before the selected data set listing is provided to the client.

4. The system of claim 1, wherein the client is associated with a particular user account for the provider network, wherein the user account is associated with the one or more resources of the network-based services before the selection of the one data set listing, and wherein to configure the selected one of the one or more resources for the client, the data discovery and consumption coordination service is configured to launch at least one of the one or more resources associated with the user account.

5. A method, comprising:

performing, by one or more computing devices:

maintaining a plurality of data set listings as part of a data discovery and consumption coordination service of a provider network that offers a plurality of network-based services, wherein each of the plurality of listings corresponds to a respective data set selectable via a network-based interface for the data discovery and coordination service, wherein the respective data sets are respective data objects that store different types of data, the data in the respective data objects aggregated from one or more data sources;

receiving, via the network-based interface for the data discovery and consumption coordination service, a request to select one of the plurality of data set listings;

in response to receiving the request to select the one data set listing:

receiving a selection of a resource hosted in one of the network-based services offered by the provider network to execute an application configured to process information in the data stored in the respective data object that is the respective data set corresponding to the selected data set listing;

configuring the selected resource in the one network-based service to receive the data object; and directing a transfer of the respective data object that is the respective data set from a storage location for a vendor of the data set to the configured resource to enable the application to process the information in the data stored in the respective data object that is the data set.

6. The method of claim 5, further comprising:

receiving a request via the network-based interface for data set listings from the client, wherein the request includes one or more search criteria;

in response to receiving the request for data set listings from the client, providing one or more data set listings of the plurality of data set listings to the client via the network-based interface, wherein the one or more data set listings are provided based, at least in part, on the one or more search criteria; and wherein the one data set listing is one of the one or more provided data set listings.

7. The method of claim 6, wherein said providing the one or more data set listings of the plurality of data set listings to the client via the network-based interface, comprises:

identifying a plurality of candidate data set listings based, at least in part on the one or more search criteria;

obtaining, at least one of:

respective user ratings for the plurality of candidate data set listings; or data set purchase history for a plurality of users accounts of the data discovery and consumption coordination service; and based, at least in part, on the respective user ratings or the data set purchase history for the plurality of user accounts, selecting from the plurality of candidate data set listings the one or more listings to provide to the client.

8. The method of claim 5, wherein the client is associated with a particular user account for the provider network, and wherein the selected one of the one or more resources for the client is a new resource from the one network-based service.

9. The method of claim 5, further comprising:
receiving from the client via the network-based interface a user rating for the selected one data set listing to be stored for the selected one data set listing;
wherein one or more other data set listings provided in response to a subsequent request for data set listings received from another client via the network-based interface are provided based, at least in part, on the user rating received for the selected one data set listing received from the client.

10. The method of claim 5, further comprising providing one or more data set listing recommendations to the client based, at least in part, on the selected one data set listing.

11. The method of claim 5, further comprising providing one or more software application listing recommendations to the client to provide access to the data set based, at least in part, on the selected one data set listing, wherein the application at the configured resource is a selected one of the one or more software application listing recommendations.

12. The method of claim 5, wherein the determining the selection of the resource is performed according to a configuration file to implement the one or more resources, wherein the configuration file is received via the network-based interface for the data discovery and consumption coordination service.

13. The method of claim 5, wherein the plurality of network-based services includes at least one of a virtual compute service, a data warehouse service, or a data stream processing service, and wherein at least one of the one or more resources is implemented as part of the virtual compute service, the data warehouse service, or the data stream processing service.

14. A non-transitory, computer-readable storage medium, storing program instructions that when executed by a plurality of computing devices cause the plurality computing devices to implement:
maintaining a plurality of data set listings as part of a data discovery and consumption coordination service of a provider network that offers a plurality of network-based services, wherein each of the plurality of listings corresponds to a respective data set selectable via a network-based interface for the data coordination and discovery service, wherein the respective data sets are respective data objects that store different types of data, the data in the respective data objects aggregated from one or more data sources;
receiving a request via the network-based interface for the data discovery and consumption coordination service for data set listings from a client, wherein the request for data set listings indicates one or more search criteria;
in response to receiving the request for data set listings, providing via the network-based interface one or more data set listings of the plurality of data set listings to the client based, at least in part, on the one or more search criteria;
in response to receiving a request via the network-based interface to select one of the one or more data set listings provided to the client:
receiving a selection of a resource hosted in one of the network-based services offered by the provider network to execute an application configured to process information in the data stored in the respective data object that is the respective data set corresponding to the selected set listing;
configuring the selected resource in the one network-based service to receive the respective data object; and
directing a transfer of the respective data object that is the data set from a storage location for a vendor of the data set to the configured resource to enable the application to process the information in the data stored in the respective data object that is the data set.

15. The non-transitory, computer-readable storage medium of claim 14, wherein, in said providing via the network-based interface the one or more data set listings of the plurality of data set listings to the client, the program instructions cause the one or more computing devices to implement:
identifying a plurality of candidate data set listings based, at least in part on the one or more search criteria;
obtaining, at least one of:
respective user ratings for the plurality of candidate data set listings; or
data set purchase history for a plurality of users accounts of the data discovery and consumption coordination service; and
based, at least in part, on the respective user ratings or the data set purchase history for the plurality of user accounts, selecting from the plurality of candidate data set listings the one or more listings to provide to the client.

16. The non-transitory, computer-readable storage medium of claim 15, wherein one of the one or more listings provided to the client is a customized data set listing generated from the plurality of data set listings based, at least in part, on the one or more search criteria.

17. The non-transitory, computer-readable storage medium of claim 15, wherein the program instructions cause the one or more computing devices to further implement validating the respective data set corresponding to the selected data set listing before the selected data set listing is provided to the client.

18. The non-transitory, computer-readable storage medium of claim 15, wherein the selection of the resource to configure is received via the network-based interface.

19. The non-transitory, computer-readable storage medium of claim 15, wherein the program instructions cause the one or more computing devices to further implement enforcing an access restriction for the application implemented at the configured resource accessing the data in the respective data object that is the respective data set.

20. The non-transitory, computer-readable storage medium of claim 15, wherein the client is associated with a particular user account for the provider network, wherein, in identifying the one or more resources, the program instructions cause the plurality of computing devices to implement identifying at least one new resource from at least one of the plurality of network-based services offered by the provider network.

* * * * *